United States Patent
Gim et al.

(10) Patent No.: US 7,142,961 B2
(45) Date of Patent: Nov. 28, 2006

(54) METHOD FOR QUANTITATIVELY ANALYZING STEER CHARACTERISTICS TO ACQUIRE STEERING STABILITY OF VEHICLES/TIRES

(75) Inventors: Gwang Hun Gim, Daejeon (KR); Jung Sik Kim, Daejeon (KR)

(73) Assignee: Hankook Tire Co., Ltd., Seoul (KR)

( * ) Notice: Subject to any disclaimer, the term of this patent is extended or adjusted under 35 U.S.C. 154(b) by 158 days.

(21) Appl. No.: 11/015,931

(22) Filed: Dec. 17, 2004

(65) Prior Publication Data
US 2006/0074535 A1    Apr. 6, 2006

(30) Foreign Application Priority Data
Oct. 5, 2004    (KR) .................... 10-2004-0079024

(51) Int. Cl.
*G06F 19/00*    (2006.01)
(52) U.S. Cl. ........................... 701/29; 701/41
(58) Field of Classification Search ............... 701/29, 701/41, 70; 702/182, 183; 73/146, 146.4, 73/146.5
See application file for complete search history.

(56) References Cited

U.S. PATENT DOCUMENTS

| | | | |
|---|---|---|---|
| 4,969,212 A | 11/1990 | Walter | |
| 6,033,337 A * | 3/2000 | Ohkuma et al. | 477/1 |
| 6,257,056 B1 * | 7/2001 | Shibayama et al. | 73/129 |
| 6,466,857 B1 * | 10/2002 | Belvo | 701/82 |
| 6,580,980 B1 | 6/2003 | Gauthier et al. | |
| 2004/0162662 A1 * | 8/2004 | Bremeier et al. | 701/70 |

* cited by examiner

*Primary Examiner*—Gary Chin
(74) *Attorney, Agent, or Firm*—Jordan and Hamburg LLP

(57) ABSTRACT

A method for quantitatively analyzing steer characteristics to acquire steering stability of vehicles/tires. The method divides the steer characteristics into understeer, oversteer, and power-off reaction characteristics, separately analyzes the understeer, oversteer, and power-off reaction characteristics, analyzes the understeer characteristic using a tuning curvature and a turning velocity characteristic in association with a vehicle turning path, analyzes the oversteer characteristic using a slope of a nose angle and a nose-angle time rate in association with a vehicle attitude, analyzes the power-off reaction characteristic using a nose-angle slope, a nose-angle change rate, and a nose-angle change amount, and compares the above-mentioned characteristics with reference data obtained from a Quasi steady-state condition test during which a vehicle driving state is stable, such that it can quantitatively determine the steer characteristics upon receipt of the result of the comparison.

14 Claims, 14 Drawing Sheets

Ideal vehicle path with *neutral steer*

**Ideal vehicle path with *neutral steer***

**Ideal vehicle attitude with *neutral steer***

METHOD FOR QUANTITATIVELY ANALYZING STEER CHARACTERISTICS TO ACQUIRE STEERING STABILITY OF VEHICLES/TIRES

BACKGROUND OF THE INVENTION

1. Field of the Invention

The present invention relates to a method for quantitatively analyzing steer characteristics to acquire steering stability of vehicles/tires, and more particularly to a method for quantitatively analyzing steer characteristics, which divides the steer characteristics into understeer, oversteer, and power-off reaction characteristics, separately analyzes the understeer, oversteer, and power-off reaction characteristics, analyzes the understeer characteristic using a turning curvature and a turning velocity in association with a vehicle turning path, analyzes the oversteer characteristic using a slope of a nose angle and a nose-angle time rate in association with a vehicle attitude, analyzes the power-off reaction characteristic using a nose-angle slope, a nose-angle change rate, and a nose-angle change amount, and compares the above-mentioned characteristics with reference data obtained from a Quasi steady-state condition test during which a vehicle driving state is stable, such that it can quantitatively determine the steer characteristics upon receipt of the result of the comparison.

2. Description of the Related Art

A representative method for quantitatively analyzing understeer and oversteer characteristics of a vehicle using a reference data concept is described in U.S. Pat. No. 4,969,212 filed by Walter et al, entitled "QUANTITATIVE MEASUREMENT OF HANDLING CHARACTERISTICS OF TIRES AND/OR VEHICLE/TIRE COMBINATIONS", which is incorporated herein by reference. The method of the U.S. Pat. No. 4,969,212 compares lateral acceleration and yaw rate generated during a vehicle running time with reference lateral acceleration and reference yaw rate, respectively, such that it quantitatively analyzes understeer and oversteer degrees.

A representative method for estimating performance of a tire using a steady-state turn test, a lift-off test, a transient state test, an emergency lane change test, and an emergency J-turn test is described in U.S. Pat. No. 6,580,980 filed by Gauthier et al, entitled "SYSTEM AND METHOD FOR TESTING DEFLATED TIRE HANDLING", which is incorporated herein by reference. The method of U.S. Pat. No. 6,580,980 provides a method for quantitatively analyzing steering stability performance of a tire using both a subjective estimation method associated with individual test methods and an objective estimation method associated with measurement data.

The last performance estimation in a vehicle/tire design process is performed by subjective assessment of an expert driver. Particularly, many parts contained in a steering stability estimation process depend on the subjective assessment method, such that the subjective assessment result is reflected in all analysis methods. The above-mentioned methods of U.S. Pat. Nos. 4,969,212 and 6,580,980 indicate the subjective assessment result of an expert estimator using basic parameters associated with vehicle movement, for example, lateral acceleration, yaw rate, and vehicle velocity parameters. However, indeed, an expert estimator prefers to perform the subjective assessment using perceptual parameters corresponding to individual assessment parameters, instead of using the above-mentioned basic vehicle movement parameters. Therefore, the above-mentioned methods have difficulty in substantially reflecting the subjective assessment result of the expert estimator in the vehicle/tire design process.

SUMMARY OF THE INVENTION

Therefore, the present invention has been made in view of the above problems, and it is an object of the invention to provide a real vehicle measurement test method for mounting a variety of sensors to a vehicle such that it can directly acquire data indicative of the movement of a real vehicle and the other data indicative of vehicle's driver information.

It is another object of the present invention to provide a method for quantitatively analyzing vehicle performance by developing an analysis method capable of objectively estimating a subjective assessment result using the above-mentioned real vehicle measurement test. The above-mentioned quantitative analysis method simultaneously performs the subjective assessment and the real vehicle measurement in association with steer characteristic parameters, or separately performs the subjective assessment and the real vehicle measurement, such that it can analyze the vehicle movement generated in the case of real subjective assessment along with driver information. Although most conventional arts have indicated steer characteristics under steady-state conditions such as a normal-circle turning test, the present invention attempts to indicate such steer characteristics under transient turning conditions generated in the case of a vehicle lane change and a circuit running state. Indeed, the subjective assessment of the steer characteristics are mainly estimated under the transient state such as a vehicle lane change or circuit cornering test, instead of a steady-state condition. Therefore, the present invention is characterized in that it can be directly applied to the vehicle/tire design process, such that it can be easily implemented with a real instrument.

The method for quantitatively analyzing steer characteristics to acquire steering stability of a vehicle and a tire according to the present invention mounts a real-vehicle measurement device to a vehicle, performs a real-vehicle test for analyzing vehicle steer characteristics (e.g., understeer, oversteer, and power-off reaction) to acquire measurement data, calculates a turning curvature, a turning velocity, a nose angle, and a nose-angle time rate on the basis of the acquired measurement data, compares the turning curvature, the turning velocity, the nose angle, and the nose-angle time rate with a predetermined turning curvature, a predetermined turning velocity, and reference nose-angle data, respectively, such that it can determine a steer characteristic degree on the basis of the result of the comparison.

BRIEF DESCRIPTION OF THE DRAWINGS

The above objects, and other features and advantages of the present invention will become more apparent after reading the following detailed description when taken in conjunction with the drawings, in which.

DESCRIPTION OF THE PREFERRED EMBODIMENTS

Figure 1:
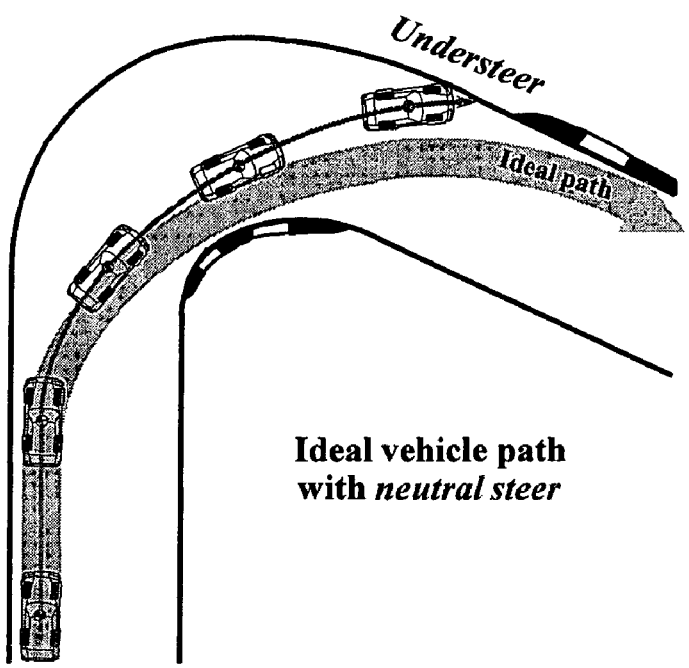
FIG. 1 is a conceptual diagram illustrating an understeer state.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

Prior to describing the present invention, it should be noted that the present invention classifies steer characteristics into three characteristics, i.e., an understeer characteristic, an oversteer characteristic, and a power-off reaction characteristic. The understeer and oversteer characteristics indicate the number of vehicle understeer occurrences and the number of vehicle oversteer occurrences, respectively. The power-off reaction characteristic indicates understeer and oversteer variation characteristics during a power on/off test in a vehicle turning operation.

The present invention defines the steer characteristics as follows.

Understeer is indicative of a specific phenomenon that a vehicle deviates from a designated path to the outside during a vehicle turning operation, and is closely associated with a front-wheel grip characteristic of a tire. In more detail, the understeer mainly occurs when the front-wheel grip is very small. In this case, the subjective assessment associated with the degree of understeer is determined by special references of individual estimators.

FIG. 1 is a conceptual diagram illustrating an understeer phenomenon felt by a real driver. In order to allow a vehicle to safely and rapidly pass a corner of FIG. 1, the vehicle must travel along an ideal path. In this case, if the vehicle has a high understeer characteristic, it is turned from the ideal path to the outside as shown in FIG. 1, resulting in an increased turning radius. In this case, a vehicle driver must enter a wider steering angle to induce the vehicle to turn along the ideal path. Therefore, heavy understeer impedes easier steering characteristics, such that the heavy understeer is not desirable. Indeed, a vehicle driver can estimate the degree of understeer by comparing a steering angle required during a vehicle turning operation and a vehicle turning behavior characteristic with reference data determined by the vehicle driver himself or herself.

Figure 2:
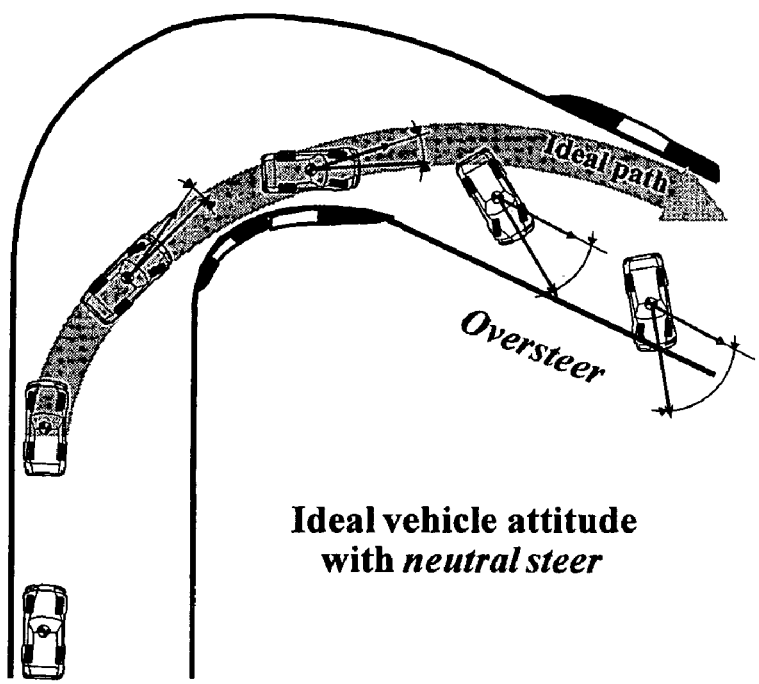
FIG. 2 is a conceptual diagram illustrating an oversteer state.

Contrary to understeer, oversteer is indicative of a specific phenomenon that a vehicle sharply steers into a vehicle turning path during a vehicle turning operation, and is closely associated with a rear-wheel grip characteristic of a tire. The understeer mainly occurs when the rear-wheel grip is insufficient. FIG. 2 is a conceptual diagram illustrating the oversteer phenomenon of a vehicle in the vehicle turning movement. The oversteer generates an unexpected large variation in a vehicle attitude indicative of an angle between a vehicle running direction and a real moving direction of a vehicle (i.e., a velocity vector direction).

In other words, the higher the oversteer, the larger the vehicle attitude angle. A general vehicle driver has difficulty in controlling heavy oversteer, such that the heavy oversteer is not desirable. Similar to understeer, the vehicle driver compares a vehicle attitude angle generated during the vehicle turning with a predetermined reference value, such that it can estimate the degree of oversteer.

Figure 3:
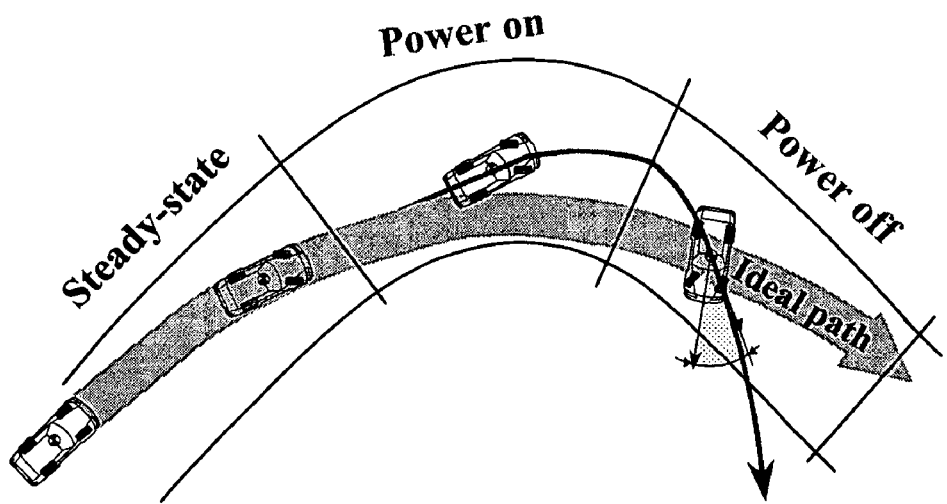
FIG. 3 is a conceptual diagram illustrating a power-off reaction state.

The power-off reaction is indicative of a variation in understeer/oversteer characteristics generated during the vehicle turning. Typically, the power-off reaction is estimated by a power on/off test during the vehicle turning as shown in FIG. 3. In this case, the mechanism for generating the variation in the above-mentioned understeer/oversteer characteristics is classified into first and second mechanisms. The first mechanism is generated by a tire grip variation caused by a full throttle ON operation generated when a vehicle is turned from a fixed steering state to a steady-state condition. In this case, the tire grip variation occurs at different locations according to vehicle drive methods. In the case of a front-wheel drive vehicle, drive power is applied to a front-wheel tire by a maximum throttle ON operation, such that a cornering force of the front-wheel tire is reduced. Contrary to the front-wheel drive vehicle, in the case of a rear-wheel drive vehicle, the cornering force of the real-wheel tire is reduced. Load transfer from the front wheel to the rear wheel occurs due to acceleration, such that vertical load applied to the front-wheel tire is decreased whereas the other vertical load applied to the rear-wheel tire is increased, resulting in variations in front wheel grip and rear wheel grip.

The second mechanism is generated by a tire grip variation caused by a throttle OFF operation suddenly generated in a constant steering state. If the sudden throttle OFF operation occurs during the vehicle turning movement, severe load transfer from a rear wheel to a front wheel occurs, such that an unexpected variation occurs in vertical load applied to a tire, resulting in a variation in tire grip. As the drive power disappears, a tire cornering force variation occurs, resulting in a variation in grip forces of a front-wheel tire and a rear-wheel tire. The vehicle driver recognizes the understeer and oversteer variations generated by the above-mentioned full throttle ON and sudden throttle OFF operations, and therefore estimates the power-off reaction characteristic. In this case, it is well known in the art that the vehicle driver estimates the degree of power-off reaction using a vehicle attitude associated with the oversteer phenomenon. Generally, in the case of a front-wheel drive vehicle, the understeer phenomenon occurs in the full throttle ON condition, and the oversteer phenomenon occurs in the sudden throttle OFF condition. In this case, the less the variation from the understeer and the oversteer, the easier the vehicle control operation, resulting in improved vehicle performance. Typically, if an operation mode is switched from a power ON mode to a power OFF mode, a smaller variation in steer characteristics is more desirable.

The present invention provides a real-vehicle test method for analyzing the above-mentioned steer characteristics. In more detail, the present invention provides a variety of methods for analyzing the understeer and oversteer characteristics, for example, a lane-changing test method, a severe lane-changing method, and a circuit cornering test method, and a power on/off test method during the vehicle turning to analyze a power-off reaction.

Figure 4:
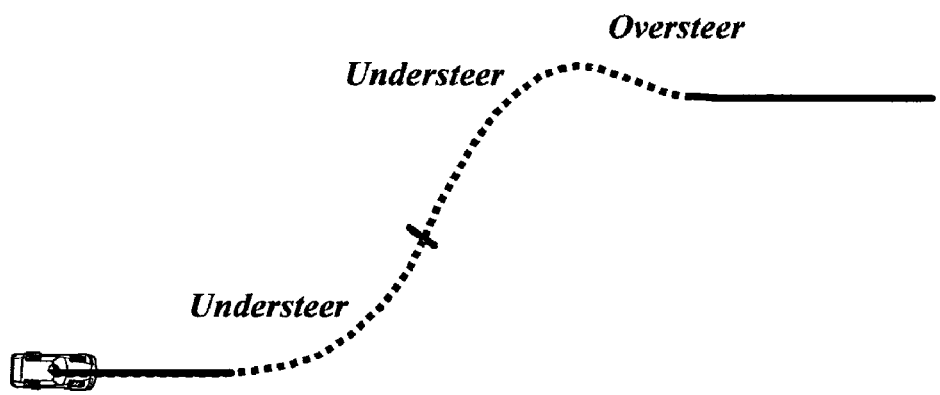
FIG. 4 is a conceptual diagram illustrating a lane-changing test method.

The lane-changing test according to the present invention is required for a specific situation that a vehicle changes from one lane to another to dodge an obstacle in the front. The vehicle movement during the lane-changing includes two consecutive turns having opposite directions as shown in FIG. 4. Typically, the understeer tendency occurs in a lane-changing entry zone and a lane-changing mid-zone, and the oversteer tendency occurs in a lane-changing exit zone. Although individual vehicle drivers use different methods for entering a steering angle during the lane-hanging test, most vehicle drivers enter a desired steering angle using the following test method.

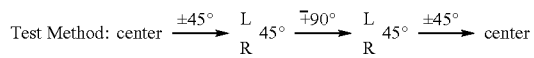

The lane-changing test of the present invention is indicative of a first lane changing test Preferably, in the case of the first lane changing test, a lane-changing width is 2.5~4.5 m, a handle entry signal is a sinusoidal signal, a handle entry angle is −180°~+180°, and vehicle speed is determined to be a constant speed in the range of 40~350 kph.

Figure 5:
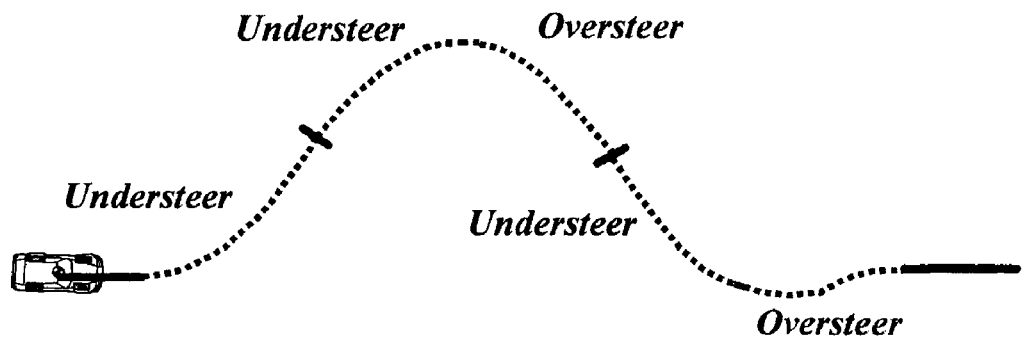
FIG. 5 is a conceptual diagram illustrating a severe lane-changing test method.

The severe lane-hanging test is used to dodge a front obstacle suddenly entered during the high-speed running of a vehicle as shown in FIG. 5, and returns to an original lane. In the case of an emergency situation, a vehicle driver normally tends to instantly perform a throttle-off operation. The severe lane-changing test includes three consecutive turns as shown in FIG. 5. In the case of the severe lane-changing test, the understeer characteristic appears in a first turn and entry zones (i.e., initial zones) of second and third turns, and the oversteer characteristic appears in the exit zones of the second and third turns. In order to perform the severe lane-changing test, a user enters a sinusoidal steering angle having an amplitude of 90° simultaneously with performing a throttle-off operation. The steering angle of the severe lane-changing test is larger than that of the lane-changing test, the vehicle movement becomes considerably severe or intense, and even worse, an unexpected problem occurs in rear-wheel stability.

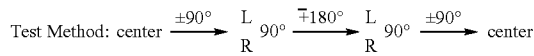

According to the present invention, the above-mentioned severe lane-changing test is used to return to an original lane after changing a first lane of a vehicle to another lane. Preferably, the severe lane-hanging test turns off an acceleration paddle simultaneously with performing a handle entry operation while the vehicle travels straight on the assumption that a lane-changing width is 2.5~4.5 m and vehicle speed is in the range of 60~200 kph.

Figure 6:
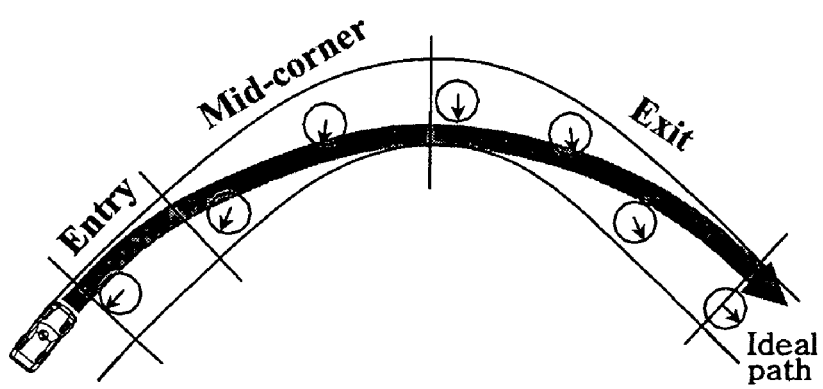
FIG. 6 is a conceptual diagram illustrating a circuit cornering test method.

FIG. 6 is a conceptual diagram illustrating a circuit cornering test method performed in a handling circuit. The circuit cornering test method is performed by a racing course running test, and can estimate understeer/oversteer tendencies in a corner entry zone and a corner exit zone. Typically, the understeer tendency occurs in the corner entry zone, and understeer and oversteer tendencies occur in the corner exit zone according to vehicle drive methods. In the mid-corner zone, the vehicle moves in a steady-state condition. Most racing vehicles are driven by a rear-wheel drive method. If a vehicle is accelerated in the corner exit zone, a cornering force applied to a rear wheel is decreased due to the occurrence of drive power at a rear tire, such that the steer characteristics is transitioned from the understeer to the oversteer.

Figure 7:
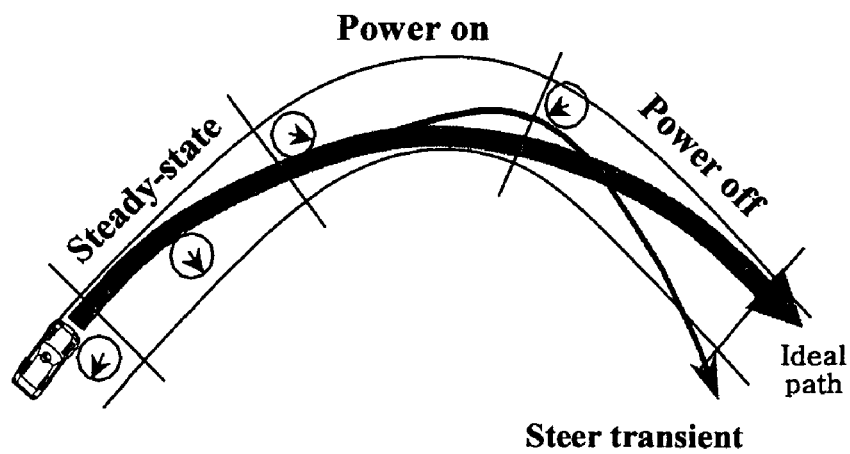
FIG. 7 is a conceptual diagram illustrating a power on/off test method in a vehicle turning operation.

FIG. 7 is a conceptual diagram illustrating a method for estimating the steer characteristics using a power on/off test in a vehicle turning operation. The main purpose of the power on/off test in the vehicle turning operation is to guarantee vehicle stability caused by load transfer from a front wheel to a rear wheel when a sudden throttle change is applied to the vehicle turning operation. The degree of sensitivity of a vehicle behavior change in association with the above-mentioned load transfer from the front wheel to the rear wheel is subjectively evaluated by power-off reaction characteristics. Typically, if a front-wheel drive vehicle performs a full throttle ON operation, the understeer tendency is increased. In the case of a rear-wheel drive vehicle, the understeer tendency is decreased, and even worse, the oversteer tendency occurs.

The above-mentioned power on/off test in the vehicle turning operation is performed by suddenly pressing an acceleration paddle during the vehicle turning, maintaining the pressed acceleration paddle, and suddenly releasing the pressed acceleration paddle. In this case, provided that an initial normal turning velocity is determined to be equal to or higher than lateral acceleration of 0.5 g, the pressed time (i.e., entry time) of the acceleration paddle is determined to be 1.0~5.0 seconds, and a maximum entry range (i.e., a maximum entry displacement) of the acceleration paddle is determined to be $A_0$ (mm), it is preferable that the acceleration paddle entry magnitude is determined in the range of ½~1.0 ratio associated with the value of $A_0$.

The steer characteristic analysis method according to the present invention is characterized in that it reflects the subjective assessment result therein. As mentioned above, the subjective assessment method associated with the steer characteristics is analyzed in detail, such that the steer characteristic analysis method is performed using driver's perceptual parameters associated with the subjective assessment of the steer characteristics.

Figure 8:
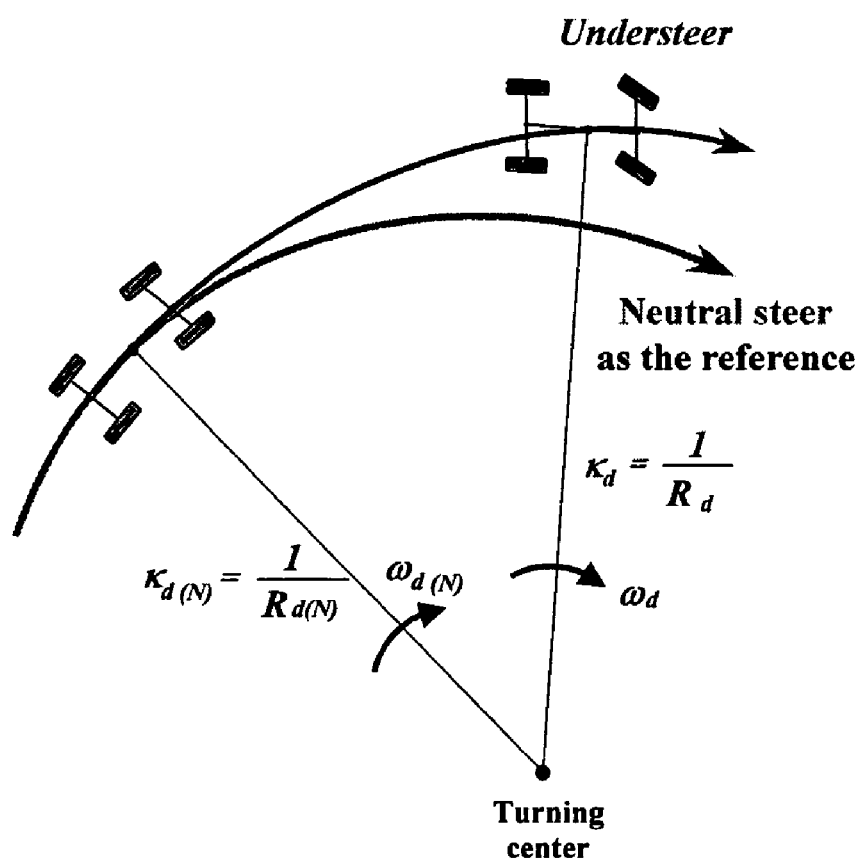
FIG. 8 is a conceptual diagram illustrating an understeer analysis method.

First, in order to analyze the understeer characteristic in which the subjective assessment result is sufficiently reflected, there is proposed a vehicle dynamics concept as shown in FIG. 8. In the case of a vehicle which has heavy understeer characteristics due to low front-wheel grip, the vehicle deviates from a turning path to the outside as shown in FIG. 8. A variety of parameters, for example, a turning radius $R_d$, a turning curvature $\kappa_d$, and a turning velocity $\omega_d$ are used to describe the above-mentioned understeer characteristic. In order to sufficiently reflect the subjective assessment result in the steer characteristic analysis method, the above-mentioned $R_d$, $\kappa_d$, and $\omega_d$ parameters are measured at the driver's seat, where $R_d$, $\kappa_d$, and $\omega_d$ can be calculated by the following equations:

$$\omega_d = \frac{a_{yd}}{V_d} \qquad \text{[Equation 1]}$$

$$\kappa_d = \frac{1}{R_d} = \frac{\omega_d}{V_d} \qquad \text{[Equation 2]}$$

where, $\alpha_{yd}$ is indicative of vehicle lateral acceleration and $V_d$ is indicative of vehicle speed. Although the degree of understeer can be represented using a turning radius, the value of $R_d$ is infinite when the vehicle travels straight, such that it is difficult to properly represent the degree of understeer. Therefore, it is more desirable that the degree of understeer is represented by comparing a vehicle turning curvature $\kappa_d$ with a reference turning curvature $\kappa_{d(N)}$. In this case, the reference turning curvature is indicative of a turning curvature in the case where a vehicle indicates neutral steer performance.

$$\Delta\kappa_d = |\kappa_{d(N)} - \kappa_d| \qquad \text{[Equation 3]}$$

Equation 3 represents the degree of understeer using a moving path during the vehicle turning movement In this case, the understeer analysis method indicates the reference turning curvature $\kappa_{d(N)}$ and a turning curvature $\kappa_d$ measured in the vicinity of either the driver's seat or the vehicle's center of gravity (i.e., a vehicle barycenter) during the real vehicle test on a Y-axis, uses a predetermined graph in which a time or a steering angle is determined to be an X-axis, calculates a difference in tuning curvature using the tuning curvature graph and the above equation 3, and analyzes the calculated difference in turning curvature.

Indeed, an expert driver considers vehicle behavior along with the above-mentioned characteristics when estimating the degree of understeer. In order to smoothly pass a given path as shown in FIG. 8, a turning velocity $\omega_d$ must be properly generated. Provided that a reference tuning velocity generated when the vehicle smoothly passes the given path is $\omega_{d(N)}$, a vehicle driver may feel neural steer. If the turning velocity $\omega_d$ generated during the vehicle turning movement is less than a reference value $\omega_{d(N)}$, the vehicle deviates from a reference turning path to the outside, such that the vehicle driver feels understeer. The above-mentioned concept can be represented by the following equation 4:

$$\Delta\omega_d = |\omega_{d(N)} - \omega_d| \qquad \text{[Equation 4]}$$

In this case, the understeer analysis method indicates the reference turning reference velocity $\omega_{d(N)}$ and the turning velocity $\omega_d$ measured during the real vehicle test on a Y-axis, uses a predetermined graph in which a time or a steering angle is determined to be an X-axis, calculates a difference in tuning velocity using the turning velocity graph and the above equation 4, and analyzes the calculated difference in turning velocity.

As the turning velocity $\omega_d$ generated during the vehicle turning movement is less than the reference tuning velocity $\omega_{d(N)}$, the degree of understeer becomes higher.

An Understeer Coefficient (US) can be represented by the following equation 5 using the above equations 3 and 4.

$$US = w_{us1}\Delta\kappa_d + w_{us2}\Delta\omega_d > 0 \qquad \text{[Equation 5]}$$

In this case, $w_{us1} \geq 0$ and $w_{us2} \geq 0$ are indicative of understeer weighting factors. The above-mentioned understeer weighting factors are determined by an expert estimator or a test condition.

In this case, according to the understeer analysis method, the understeer coefficient (US) is determined by the above equation 5 using the tuning curvature difference and the turning velocity difference. In this case, the tuning curvature difference $\Delta\kappa_d$ and the turning velocity difference $\Delta\omega_d$ are quantitatively analyzed by selecting a maximum value or a mean value from the tuning curvature graph and the turning velocity graph obtained by the real vehicle test.

As can be seen from the above equation 5, as the tuning curvature and the turning velocity generated in the real vehicle test are less than reference values, the degree of understeer becomes higher.

Figure 9:
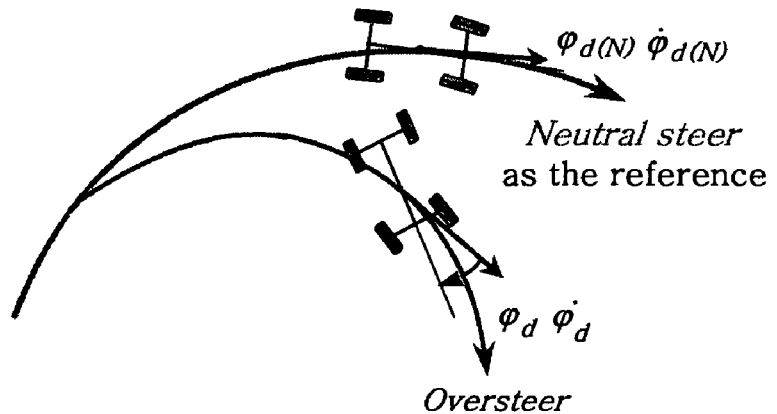
FIG. 9 is a conceptual diagram illustrating an oversteer analysis method.

In the meantime, the subjective assessment of an expert driver in association with oversteer is mainly affected by a vehicle attitude as shown in FIG. 9. The oversteer is indicative of a specific phenomenon that more slip occurs at a rear wheel due to insufficient rear wheel grip generated during the vehicle turning movement In this case, the oversteer phenomenon can be explained by a nose angle indicative of a predetermined angle between a vehicle turning direction and a real moving direction of a vehicle. The nose angle $\phi_d$ at the driver's position is denoted by the following equation 6:

$$\varphi_d = -\text{sign}(\omega_d)\tan^{-1}\frac{V_{yd}}{V_{xd}} \qquad \text{[Equation 6]}$$

where $V_{xd}$ is indicative of a longitudinal velocity component at the driver's position, and $V_{yd}$ is indicative of a lateral velocity component at the driver's position. A nose-angle time rate is associated with oversteer felt by the vehicle driver, and can be calculated by the following equation 7:

$$\dot{\phi}_d = \dot{\Psi} - \omega_d \qquad \text{[Equation 7]}$$

where $\dot{\Psi}$ is indicative of a yaw rate.

Similar to understeer, the oversteer factor can be represented by the following equation 8 using the nose angle $\phi_d$ and the reference nose angle $\phi_{d(N)}$:

$$\Delta\phi_d = |\phi_d - \phi_{d(N)}| \qquad \text{[Equation 8]}$$

In this case, the oversteer analysis method indicates a reference nose angle $\phi_{d(N)}$ and a nose angle $\phi_d$ measured during the real vehicle test on a Y-axis, uses a predetermined graph in which a time or a steering angle is determined to be an X-axis, calculates a difference in nose angle using the nose angle graph and the above equation 8, and analyzes the calculated difference in nose angle.

Also, the reference nose-angle time rate $\dot{\phi}_{d(N)}$ in a steady state condition becomes zero, such that the oversteer factor can be denoted by the following equation 9 using only the nose-angle time rate $\dot{\phi}_d$:

$$\Delta\dot{\phi}_d = |\dot{\phi}_d| \qquad \text{[Equation 9]}$$

In this case, the oversteer analysis method indicates a nose-angle time rate measured during the real vehicle test on a Y-axis, uses a predetermined graph in which a time or a steering angle is determined to be an X-axis, calculates a difference in nose angle using the nose-angle time rate graph and the above equation 9, and analyzes the calculated difference in nose-angle time rate.

In this case, the higher the difference in nose-angle time rate, the higher the oversteer tendency.

An Oversteer Coefficient (OS) indicative of the oversteer tendency can be represented by the following equation 10 using the values $\Delta\phi_d$ and $\Delta\dot{\phi}_d$ of the above equations 8 and 9.

$$OS = w_{os1}\Delta\phi_d + w_{os2}\Delta\dot{\phi}_d > 0 \qquad \text{[Equation 10]}$$

In this case, $w_{os1} \geqq 0$ and $w_{os2} \geqq 0$ are indicative of oversteer weighting factors. The above-mentioned oversteer weighting factors are determined by an expert estimator or a test condition.

In this case, according to the oversteer analysis method, the oversteer coefficient (OS) is determined by the above equation 10 using the nose angle difference $\Delta\phi_d$ and the nose-angle time rate difference $\Delta\dot\phi_d$. In this case, the nose angle difference $\Delta\phi_d$ and the nose-angle time rate difference $\Delta\dot\phi_d$ are quantitatively analyzed by selecting a maximum value or a mean value from the nose angle graph and the nose-angle time rate graph obtained by the real vehicle test.

As can be seen from the above equation 10, as the values $\phi_d$ and $\dot\phi_d$ generated during the vehicle tuning are higher than reference values, the degree of oversteer becomes higher.

Figure 10:
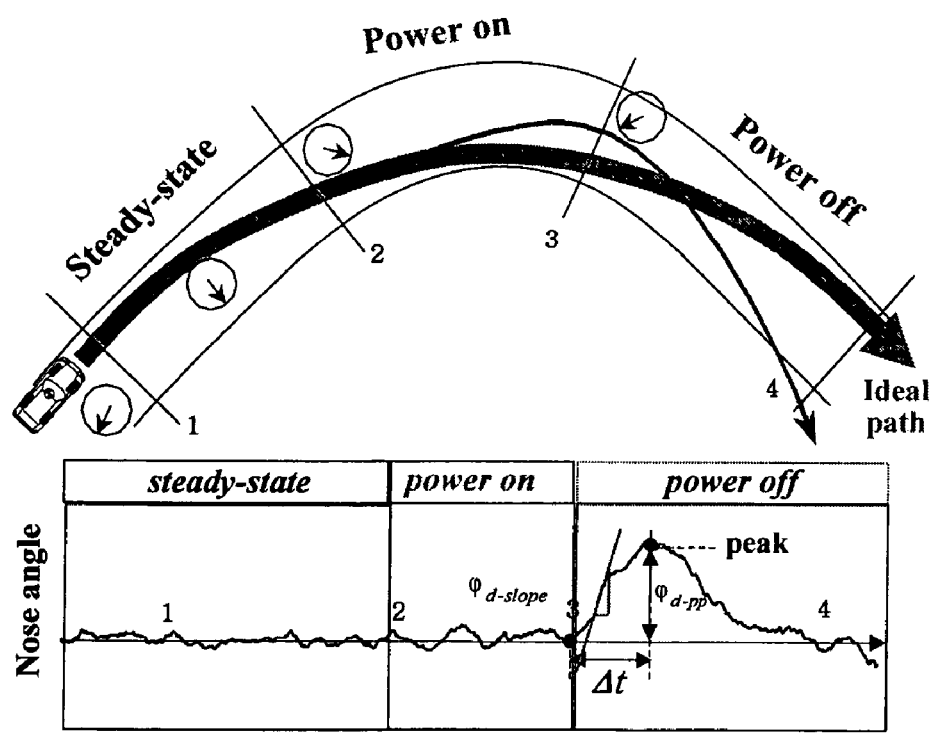
FIG. 10 is a conceptual diagram illustrating a power-off reaction analysis method.

In the meantime, if a vehicle performs a throttle ON operation while being transitioned to a steady-state condition as shown in FIG. 10, the understeer tendency generally occurs. Then, if the vehicle performs a throttle OFF operation, load transfer from the front wheel to the rear wheel occurs, such that tire grip applied to the rear-wheel tire is decreased, resulting in the occurrence of oversteer. A power-off reaction is indicative of steer characteristics change from understeer to oversteer when an external command is applied from a throttle or a brake to the vehicle during the vehicle turning movement. The power-off reaction characteristic felt by the expert driver may be closely associated with the value of $\phi_d$ as shown in FIG. 10.

When analyzing measurement data associated with the power on/off test in a real turning of the vehicle, it can be recognized that the value of $\phi_d$ is abruptly changed. Therefore, the present invention defines the power-off reaction coefficient (PR) as the following equation 11 using the value of $\phi_d$:

$$PR \equiv w_{pr1}|\varphi_{d\_slope}| + w_{pr2}\frac{|\varphi_{d\_pp}|}{\Delta t} + w_{pr3}|\varphi_{d\_pp}| > 0 \quad \text{[Equation 11]}$$

Figure 20:
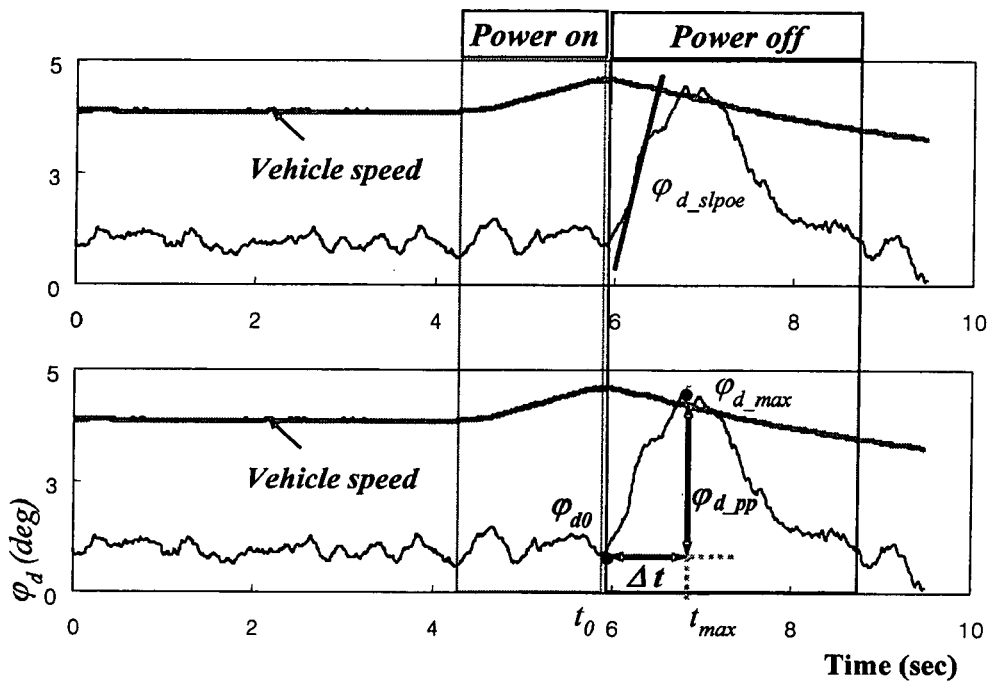
FIG. 20 is a graph illustrating a variation in nose angle during a power on/off test in a vehicle turning operation.

In this case, $w_{pr1} \geqq 0$, $w_{pr2} \geqq 0$ and $w_{pr3} \geqq 0$ are indicative of power-off reaction weighting factors. The above-mentioned power-off reaction weighting factors are determined by an expert estimator or a test condition. The value of $|\phi_{d\_slope}|$ is indicative of a slope of a nose angle as shown in FIG. 20. The value of $|\phi_{d\_pp}|/\Delta t$ is indicative of a nose-angle time rate, and is equal to a calculation value generated by dividing a difference between the value of $\phi_d$ in a steady-state condition and a maximum value $\phi_d$ generated in a power on/off test by the value of $\Delta t$ as shown in FIG. 20. The value of $|\phi_{d\_pp}|$ is indicative of a nose-angle change amount, and is equal to the magnitude of a maximum variation of the value of $\phi_d$ generated in the power on/off test. There are a variety of power-off reaction characteristics felt by a vehicle driver, such that the power-off reaction characteristic is analyzed using the above-mentioned three factors.

The power-off reaction analysis method based on the above equation 11 indicates the nose angle $\phi_d$ on a Y-axis, quantitatively calculates a nose-angle slope $|\phi_{d\_slope}|$ and a nose-angle change rate $|\phi_{d\_pp}|/\Delta t$ on the basis of a specific graph in which time is determined to be an X-axis, and analyzes the calculated values $|\phi_{d\_slope}|$ and $|\phi_{d\_pp}|/\Delta t$.

In conclusion, the value of PR is indicative of the degree of a vehicle nose-angle change during the power on/off test in the vehicle turning operation. Typically, if the degree of the nose-angle change is small and the nose-angle variation smoothly occurs, the movement of the vehicle is stable, resulting in improved vehicle performance.

According to the above-mentioned analysis methods, understeer and oversteer are represented by comparing the turning curvature $\kappa_d$, the turning velocity $\omega_d$, and the nose angle $\phi_d$ with a reference turning curvature $\kappa_{d(N)}$, a reference turning velocity $\omega_{d(N)}$, and a reference nose angle $\phi_{d(N)}$, respectively. The above-mentioned analysis methods represent the above reference values in the form of neutral steer. The present invention determines a specific state in which a vehicle stably moves in a steady-state condition to be the neutral steer. Therefore, the present invention uses a variety of test methods for slowly entering a steering angle to prevent the occurrence of transient characteristics of the vehicle such that reference data is extracted, for example, a normal circle-turning test method, a weave steering test method, and a progressive steering test method.

The normal circle-turning test uses a test method for changing a turning radius at a constant vehicle speed. In this case, the vehicle speed is determined in the range of 40~350 kph for use in a real vehicle estimation test, and a turning radius is determined in the range of 10~200 m so that a handle entry range is determined to be −360°~+360°.

The weave steering test slowly sweeps a steering angle using a triangular or sinusoidal wave at a predetermined vehicle speed. In this case, a handle entry angle ranges from −360° to +360°, and includes reference data associated with an area having a large steering angle. A handle entry speed is determined to be a low value of 1~50 degrees/s or less. Also, the vehicle speed is determined in the range of 40~350 kph for use in a real vehicle estimation test. In the case of the handle entry operation, a variety of tests associated with one or more periods are made available, and data associated with handle entry operations of several periods is averaged and used as reference data.

The progressive steering test separately performs a left-side turning test and a right-side turning test at a predetermined vehicle speed, and uses the results as reference data Otherwise, the progressive steering test performs the left-side and right-side turning tests, adds left data and right data, and uses the added result as reference data In this case, the handle entry range is in the range from −360° to +360°, and includes reference data associated with an area having a large steering angle. A handle entry speed is determined to be a low value of 1~50 degrees/s. Also, the vehicle speed is determined in the range of 40~350 kph for use in a real vehicle estimation test.

Figure 11:
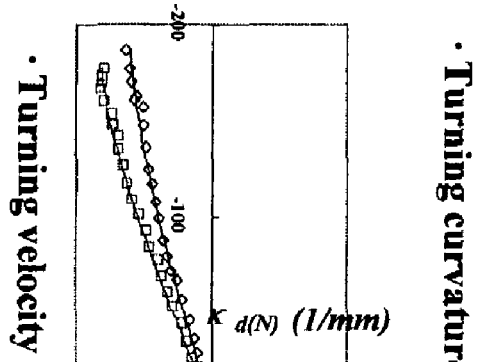
FIG. 11 is a graph illustrating reference data associated with a steering angle.
Figure 11:
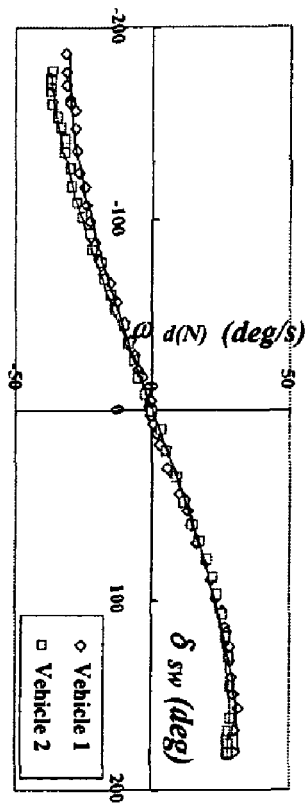
Figure 11:
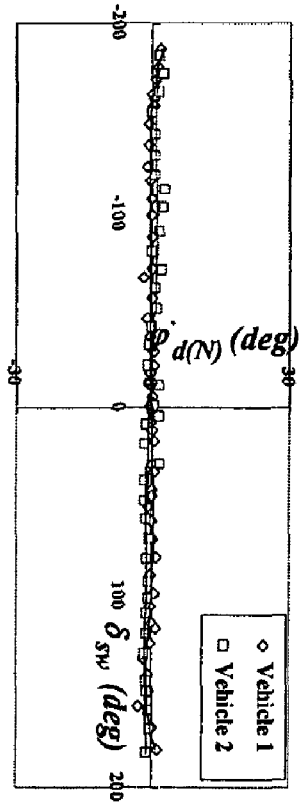
Figure 11:
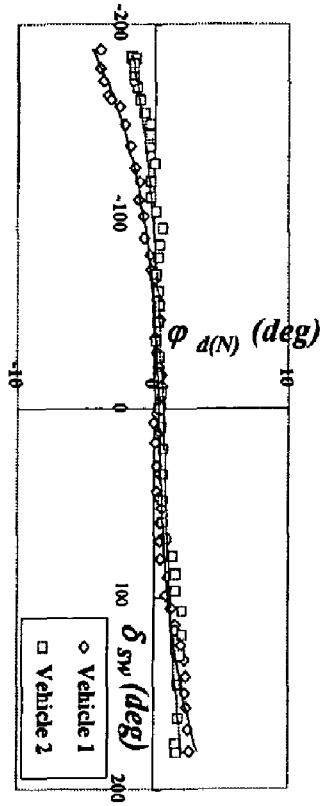

Using the above-method methods, the reference tuning curvature, the turning velocity, and the nose angle are fit to a curve (also called a curve-fitting process) using a steering angle function, such that they can be represented as shown in FIG. 11.

A variety of test methods for analyzing the steer characteristics have been described as mentioned above. For example, a lane-changing test, a severe lane-changing test, a circuit cornering test, a power on/off reaction during the vehicle turning, and a plurality of analysis factors (e.g., US, OS, PR) have been described.

The steer characteristic analysis result to which the above-mentioned test methods and the above analysis factors are applied is as follows.

FIG. 11 shows result data obtained by calculating reference data of a first vehicle and the other reference data of a second vehicle using the above-mentioned weave steering test method. FIG. 11 represents a plurality of reference data units to be importantly used to analyze the steer characteristics, for example, a turning curvature, a turning velocity, a nose angle, and a nose-angle time rate, in association with a steering angle. It can be recognized that the nose-angle time rate is close to zero in association with all steering-angle areas.

Figure 12A:
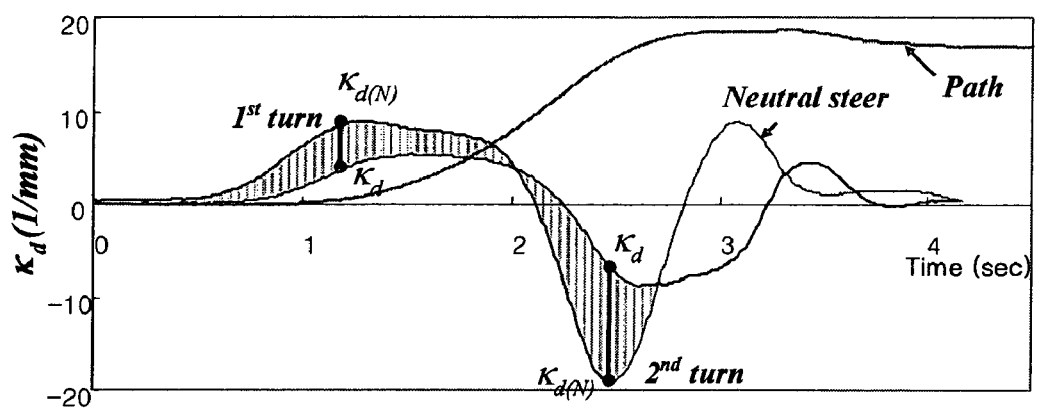
FIGS. 12a~12b are graphs illustrating a turning curvature and a turning velocity during a lane-changing test.
Figure 12B:
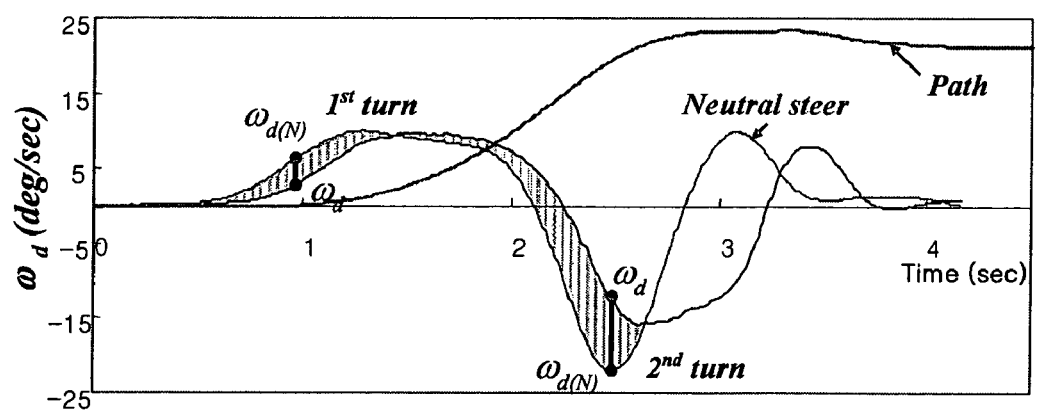

FIGS. 12a~12b are graphs illustrating the understeer analysis method for use in a lane-changing test. In order to analyze the degree of understeer in FIG. 12a, a reference turning curvature $\kappa_{d(N)}$ and a turning curvature $\kappa_d$ measured during a lane-changing test are indicated on a Y-axis, and a specific graph in which time is determined to be an X-axis is shown in FIG. 12a. The values of $\kappa_d$ and $\kappa_{d(N)}$ of a first turning of the lane-changing entry zone are compared with those of a second turning of the lane-changing mid-zone. The value of $|\kappa_d|$ is less than the value of $|\kappa_{d(N)}|$ in each of the first and second turning zones, such that understeer occurs. Similar to FIG. 12a, as can be seen from FIG. 12b, the value of $|\omega_d|$ in each of the first and second turning zones is less than the value of $|\omega_{d(N)}|$, such that understeer occurs. It can be recognized that the understeer mainly occurs in two zones during the above-mentioned lane-changing tests.

The value $\Delta\kappa_d$ is calculated by substituting the values of $\kappa_d$ and $\kappa_{d(N)}$ into the above equation 3, and the value $\Delta\omega_d$ is calculated by substituting the values of $\omega_d$ and $\omega_{d(N)}$ into the above equation 4. The value of US associated with two zones can be calculated by substituting the values of $\Delta\kappa_d$ and $\Delta\omega_d$ into equation 5.

Figure 13A:
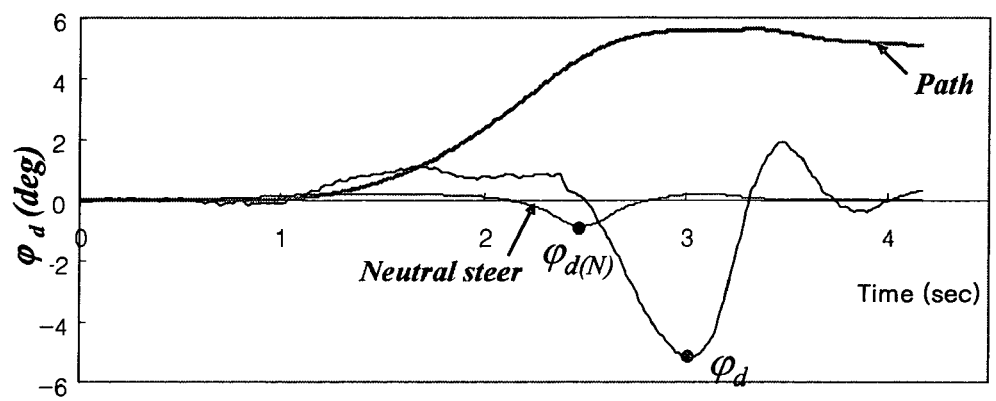
FIGS. 13a~13b are graphs illustrating a nose angle and a nose-angle time rate during a lane-changing test.
Figure 13B:
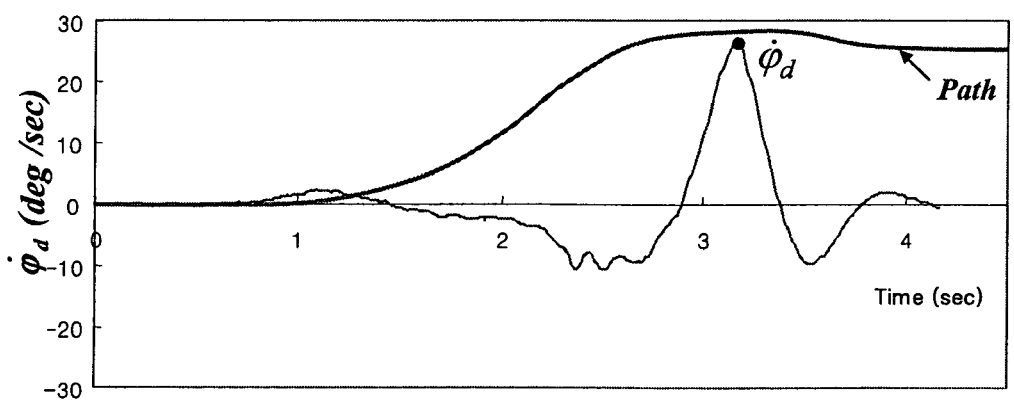

FIGS. 13a~13b illustrate the oversteer analysis method for use in a lane-changing test. In order to analyze the degree of oversteer in FIG. 13a, a reference nose angle $\phi_{d(N)}$ and a nose angle $\phi_d$ measured during a lane-changing test are indicated on a Y-axis, and a specific graph in which time is determined to be an X-axis is shown in FIG. 13a. The value of $|\phi_d|$ is higher than the value of $|\phi_{d(N)}|$ in the lane-changing exit zone, such that oversteer occurs. Similar to FIG. 13a, as can be seen from FIG. 13b, the value of $|\dot\phi_d|$ is increased in the lane-hanging exit zone.

The value $\Delta\phi_d$ is calculated by substituting the values of $\phi_d$ and $\phi_{d(N)}$ into the above equation 8, and the value $\Delta\dot\phi_d$ is calculated by substituting the value of $\dot\phi_d$ into the above equation 9. The value of OS can be calculated by substituting the values of $\Delta\phi_d$ and $\Delta\dot\phi_d$ bid into equation 10.

Figure 14A:
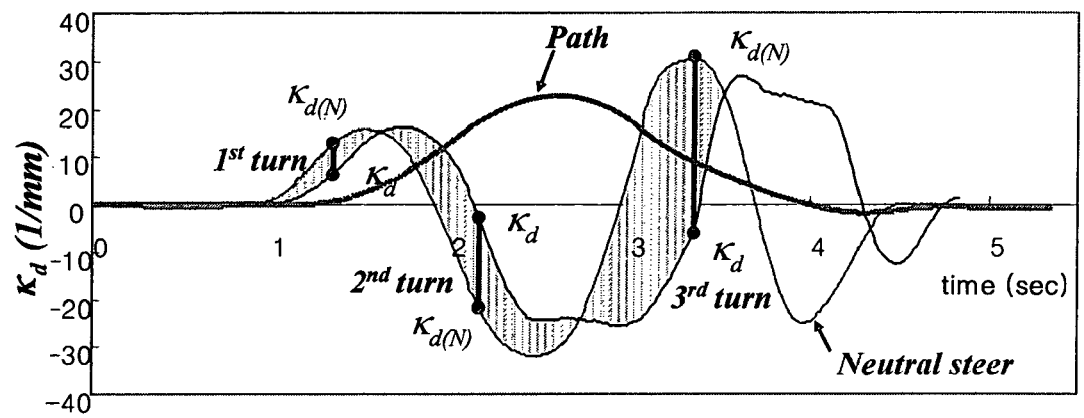
FIGS. 14a~14b are graphs illustrating a turning curvature and a turning velocity during a severe lane-changing test.
Figure 14B:
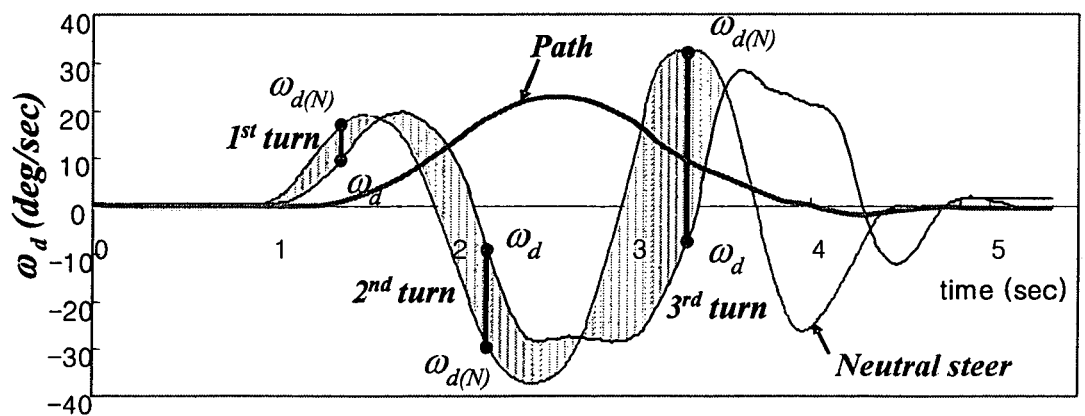

FIGS. 14a~14b are graphs illustrating an understeer analysis method for use in a severe lane-changing test In order to analyze the degree of understeer in FIG. 14a, a reference turning curvature $\kappa_{d(N)}$ and a turning curvature $\kappa_d$ measured during a severe lane-changing test are indicated on a Y-axis, and a specific graph in which time is determined to be an X-axis is shown in FIG. 14a. During the severe lane-changing test, the values of $\kappa_d$ and $\kappa_{d(N)}$ in an entry zone of the first turning zone is compared with those in individual entry zones of the second and third turning zones. The value of $|\kappa_d|$ is less than the value of $|\kappa_d|$ such that understeer occurs. Similar to FIG. 14a, as can be seen from FIG. 14b, the value of $|\omega_d|$ in each of the first to third turning zones is less than the value of $|\omega_{d(N)}|$, such that understeer occurs. It can be recognized that the understeer occurs in all three zones during the above-mentioned severe lane-changing test The value $\Delta\kappa_d$ is calculated by substituting the values of $\kappa_d$ and $\kappa_{d(N)}$ into the above equation 3, and the value $\Delta\omega_d$ is calculated by substituting the values of $\omega_d$ and $\omega_{d(N)}$ the above equation 4. The value of US associated with three zones can be calculated by substituting the values of $\Delta\kappa_d$ and $\Delta\omega_d$ into equation 5.

Figure 15A:
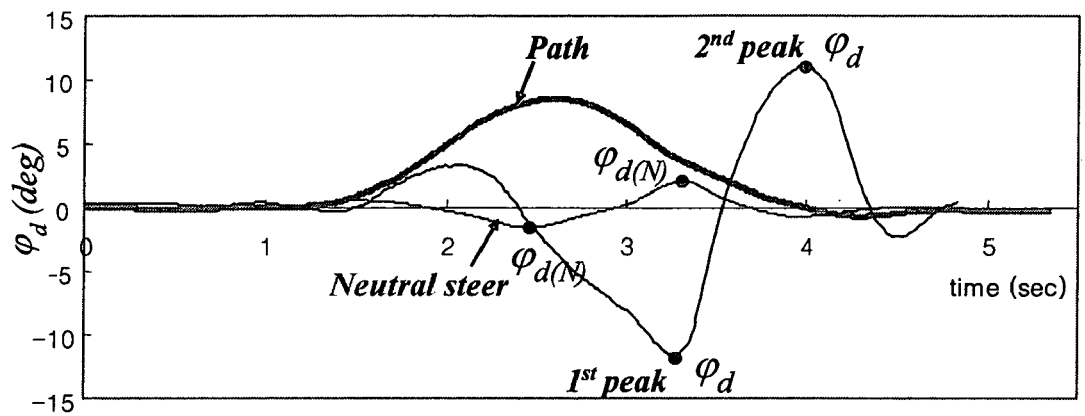
FIGS. 15a~15b are graphs illustrating a nose angle and a nose-angle time rate during a severe lane-changing test.
Figure 15B:
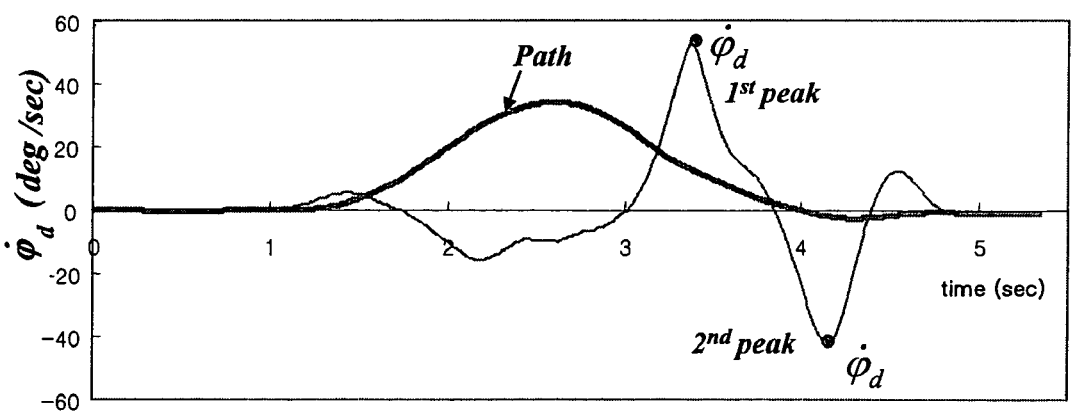

FIGS. 15a~15b are graphs illustrating an oversteer analysis method for use in a severe lane-changing test. In order to analyze the degree of oversteer in FIG. 15a, a reference nose angle $\phi_{d(N)}$ and a nose angle $\phi_d$ measured during a severe lane-changing test are indicated on a Y-axis, and a specific graph in which time is determined to be an X-axis is shown in FIG. 15a. During the severe lane-changing test, the value of $|\phi_d|$ is higher than the value of $|\phi_{d(N)}|$ in individual exit zones of the second and third tuning zones, such that oversteer occurs. Similar to FIG. 15a, as can be seen from FIG. 15b, the value of $|\dot\phi_d|$ is greatly increased in the exit zones of the second and third turning zones during the severe lane-changing test. The value $\Delta\phi_d$ is calculated by substituting the values of $\phi_d$ and $\phi_{d(N)}$ into the above equation 8, and the value $\Delta\dot\phi_d$ is calculated by substituting the value of $\dot\phi_d$ into the above equation 9. The value of OS associated with two zones can be calculated by substituting the values of $\Delta\phi_d$ and $\Delta\dot\phi_d$ into equation 10.

Figure 16A:
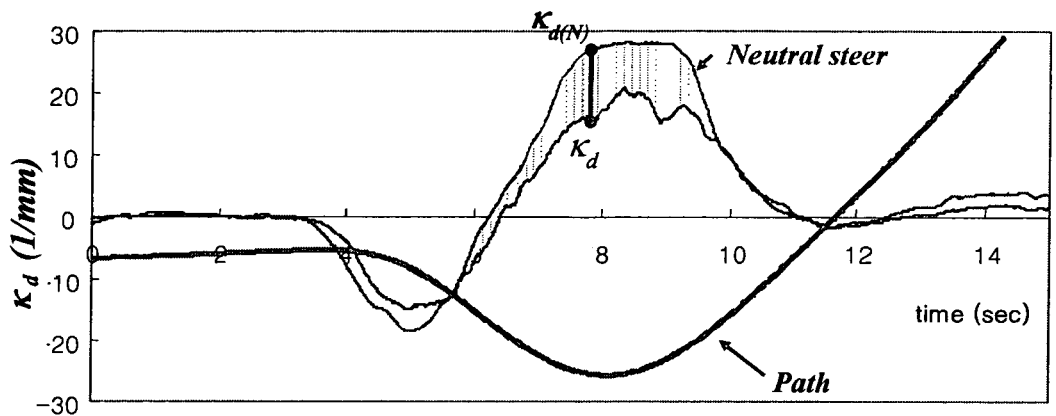
FIGS. 16a~16b are graphs illustrating a turning curvature and a turning velocity during a circuit cornering test.
Figure 16B:
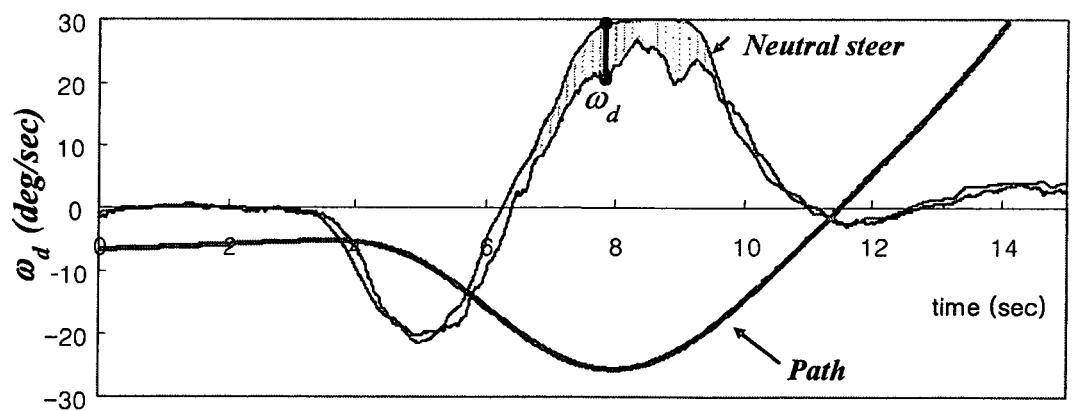

FIGS. 16a~16b are graphs illustrating an understeer analysis method for use in a circuit cornering test. In order to analyze the degree of understeer in FIG. 16a, a reference turning curvature $\kappa_{d(N)}$ and a tuning curvature $\kappa_d$ measured during a circuit cornering test are indicated on a Y-axis, and a specific graph in which time is determined to be an X-axis is shown in FIG. 16a. The value of $|\kappa_d|$ is less than the value of $|\kappa_{d(N)}|$ in the circuit cornering test, such that understeer occurs. Similar to FIG. 16a, as can be seen from FIG. 16b, the value of $|\omega_d|$ is less than the value of $|\phi_{d(N)}|$, such that understeer occurs. The value $\Delta\kappa_d$ is calculated by substituting the values of $\kappa_d$ and $\kappa_{d(N)}$ into the above equation 3, and the value $\Delta\omega_d$ is calculated by substituting the values of $\kappa_d$ and $\kappa_{d(N)}$ into the above equation 4. The value of US can be calculated by substituting the values of $\Delta\kappa_d$ and $\Delta\omega_d$ into equation 5.

Figure 17A:
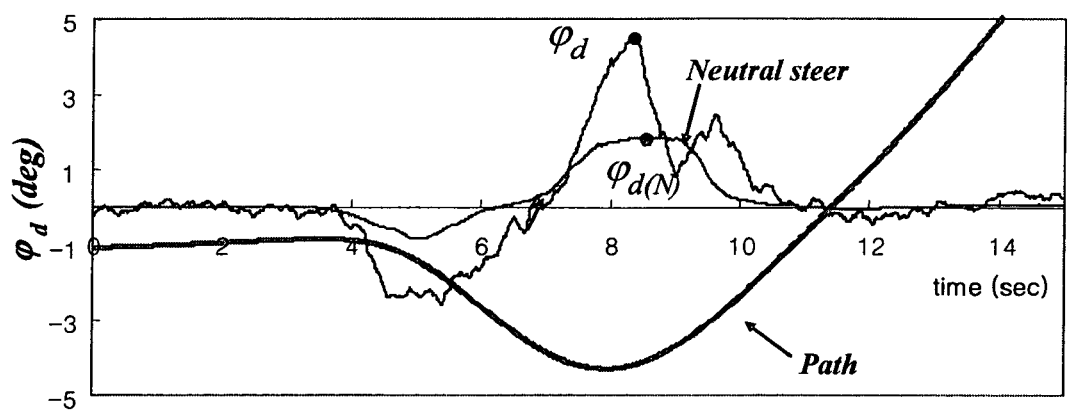
FIGS. 17a~17b are graphs illustrating a nose angle and a nose-angle time rate during a circuit cornering test.
Figure 17B:
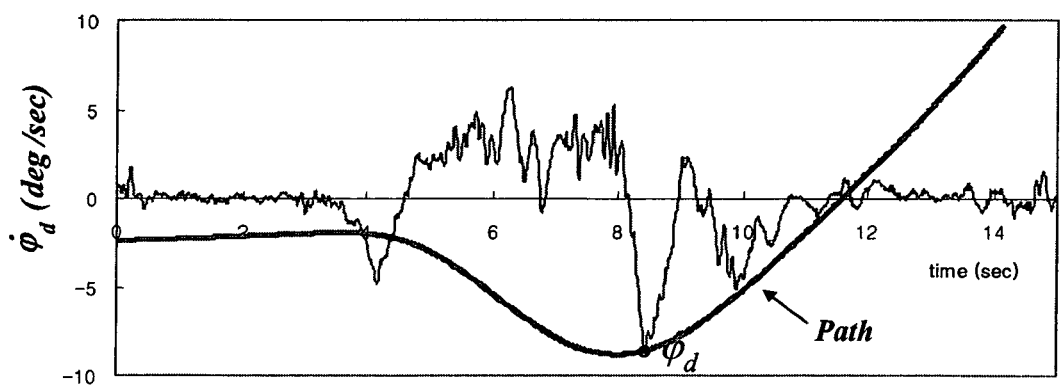

FIGS. 17a~17b are graphs illustrating an oversteer analysis method for use in a circuit cornering test. In order to analyze the degree of oversteer in FIG. 17a, a reference nose angle $\phi_{d(N)}$ and a nose angle $\phi_d$ measured during a circuit cornering test are indicated on a Y-axis, and a specific graph in which time is determined to be an X-axis is shown in FIG. 17a. The value of $|\omega_d|$ is higher than the value of $|\omega_{d(N)}|$ in the circuit cornering test, such that oversteer occurs. Similar to FIG. 17a, as can be seen from FIG. 17b, the value of $|\dot\phi_d|$ is greatly increased in the circuit cornering test. The value $\Delta\phi_d$ is calculated by substituting the values of $\phi_d$ and $\phi_{d(N)}$ into the above equation 8, and the value $\Delta\dot\phi_d$ is calculated by substituting the value of $\dot\phi_d$ the above equation 8. The value of OS associated with two zones can be calculated by substituting the values of $\Delta\phi_d$ and $\Delta\dot\phi_d$ into equation 10.

Figure 18:
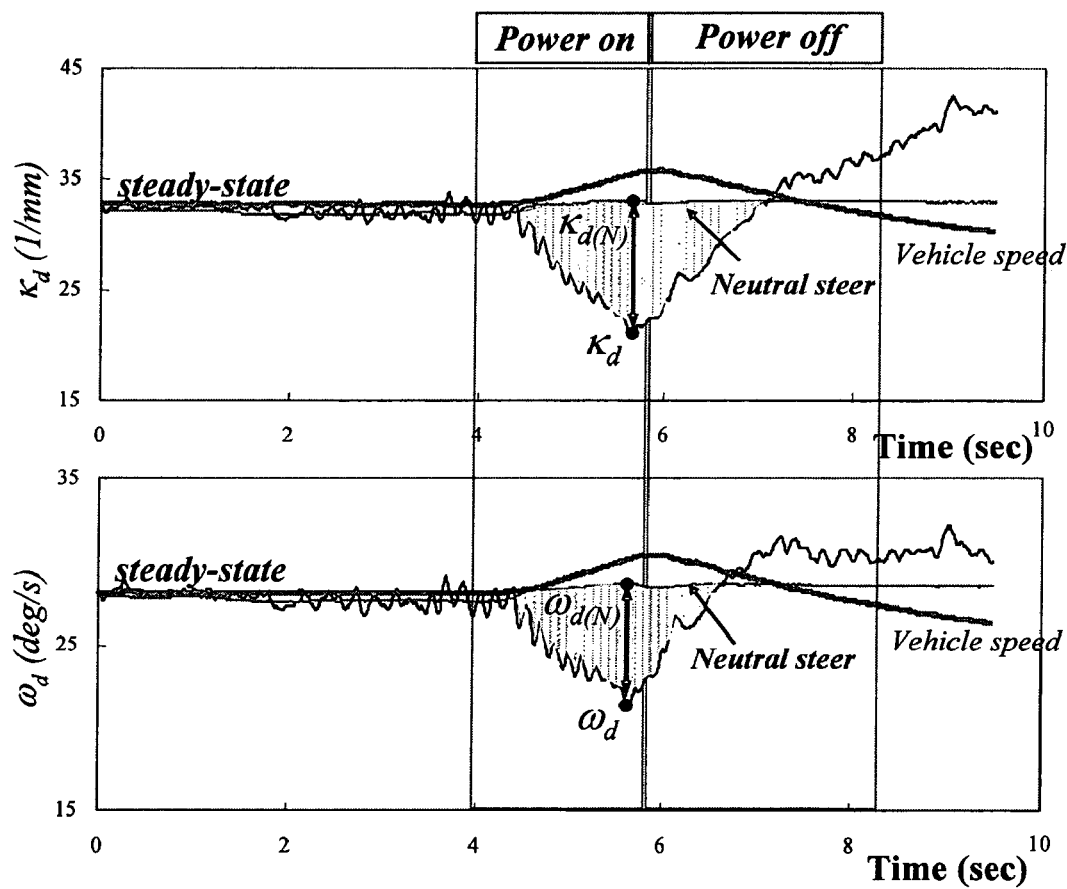
FIG. 18 is a graph illustrating a turning curvature and a turning velocity during a power on/off test in a vehicle turning operation.

FIG. 18 is a graph illustrating an understeer analysis method for use in a power on/off test in a vehicle turning operation. In order to analyze the degree of understeer in FIG. 18, a reference turning curvature $\kappa_{d(N)}$ and a turning curvature $\kappa_d$ measured during the power on/off test in the vehicle turning operation are indicated on a Y-axis, and a specific graph in which time is determined to be an X-axis is shown in FIG. 18. The value of $|\kappa_d|$ is less than the value of $|\kappa_{d(N)}|$ in the power on/off test in the vehicle turning operation, such that understeer occurs. In this manner, the value of $|\kappa_d|$ is less than the value of $|\kappa_{d(N)}|$, such that understeer occurs. The value $\Delta\kappa_d$ is calculated by substituting the values of $\kappa_d$ and $\kappa_{d(N)}$ into the above equation 3, and the value $\Delta\omega_d$ is calculated by substituting the values of $\omega_d$ and $\omega_{d(N)}$ into the above equation 4. The value of US associated with three zones can be calculated by substituting the values of $\Delta\kappa_d$ and $\Delta\omega_d$ into equation 5.

Figure 19:
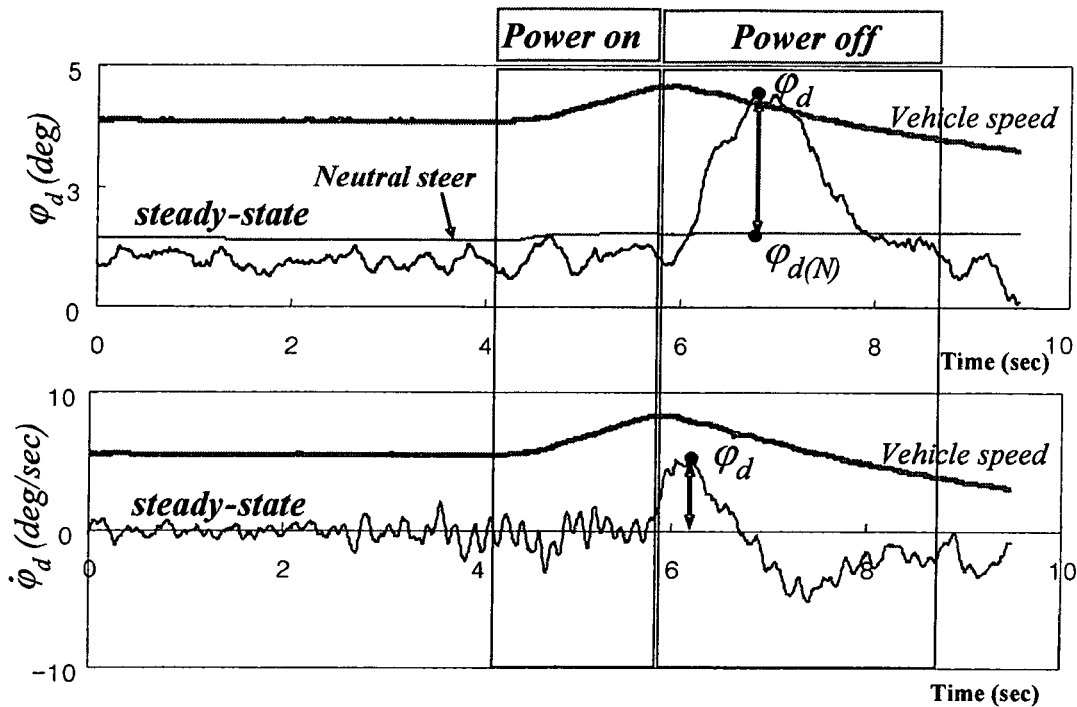
FIG. 19 is a graph illustrating a nose angle and a nose-angle time rate during a power on/off test in a vehicle turning operation.

FIG. 19 is a graph illustrating an oversteer analysis method for use in a power on/off test in the vehicle turning operation. In order to analyze the degree of oversteer in FIG. 19, a reference nose angle $\phi_{d(N)}$ and a nose angle $\phi_d$ measured during the power on/off test in the vehicle turning operation are indicated on a Y-axis, and a specific graph in which time is determined to be an X-axis is shown in FIG. 19. The value of $|\phi_d|$ is higher than the value of $|\phi_{d(N)}|$ in a power-off zone during the power on/off test in the vehicle tuning operation, such that oversteer occurs. In this manner, the value of $|\dot{\phi}_d|$ is greatly increased in the power-off zone. The value $\Delta\phi_d$ is calculated by substituting the values of $\phi_d$ and $\phi_{d(N)}$ into the above equation 8, and the value $\Delta\dot{\phi}_d$ is calculated by substituting the value of $\dot{\phi}_d$ into the above equation The value of OS associated with two zones can be calculated by substituting the values of $\Delta\phi_d$ and $\Delta\dot{\phi}_d$ into equation 10.

FIG. 20 is a graph illustrating a power-off reaction analysis method for use in the power on/off test in the vehicle turning operation. In order to analyze the degree of power-off reaction in FIG. 20, a nose angle $\phi_d$ is indicated on a Y-axis, and a specific graph in which time is determined to be an X-axis is shown in FIG. 20. It can be recognized that there is little variation in nose angle in the power-on zone and at the same time the nose angle greatly changes in the power-on zone. Therefore, a nose angle slope, $\phi_{d\_slope}$, a nose-angle change rate $\phi_{d\_pp}/\Delta t$, and a nose-angle change amount $\phi_{d\_pp}$ are calculated using the graph shown in FIG. 20, and the calculated values $\phi_{d\_slope}$, $\phi_{d\_pp}/\Delta t$, and $\phi_{d\_pp}$ are applied to the above e the value of PR can be calculated.

In order to verify efficiency of the steer characteristic analysis method proposed by the present invention, a variety of tests shown in the following table 1 are performed.

reflection degree of the above-mentioned analysis techniques capable of reflecting the subjective assessment result in the steer characteristics can be recognized. In the case of a first set 1 of the above table 1, tests of first to third groups 1~3 associated with variations in a tire and a vehicle are executed. The test of the group 1 changes the size of a tire, an air pressure of the tire, and a pattern of the tire on the condition that two persons are seated in a front-wheel drive vehicle. The test of the group 2 changes an air pressure of the tire on the condition that passenger capacity of the front-wheel drive vehicle is full (also called a "gross vehicle weight state").

The test of the group 3 is indicative of a test for changing design parameters of the tire to others in the rear-wheel drive vehicle.

In order to verify efficiency of the above-mentioned analysis techniques in association with a plurality of vehicle drivers, the test of the set 2 is performed. The set 2 performs a test associated with thee drivers (i.e., a driver 1, a driver 2, and a driver 3).

The following table 2 shows an understeer analysis method proposed by the present invention. The understeer analysis results of the lane-changing test, the severe lane-hanging test, the circuit cornering test, and the power on/off test in a vehicle turning operation using the above equations 3, 4, and 5, the subjective assessment result, and the correlation are shown in the following table 2. In this case, the

TABLE 1

| Test set | Test group | Test car | Tire size | Load | I.P (psi) Front | I.P (psi) Rear | US Rating | OS Rating | PR Rating | Comment |
|---|---|---|---|---|---|---|---|---|---|---|
| Set1 | Group 1 | Vehicle 1 (FF-Car) | 205/55R16V | Curb + 2 persons | 15 | 30 | 3.0 | 8.0 | 4.0 | With various tire inflation pressures |
| | | | | | 21 | 30 | 4.0 | 5.0 | 3.0 | |
| | | | | | 30 | 30 | 5.0 | 7.0 | 5.0 | |
| | | | | | 30 | 20 | 5.0 | 5.0 | 6.0 | |
| | | | | | 30 | 15 | 5.0 | 4.0 | 6.0 | |
| | | | 215/45ZR17 | Curb + 2 persons | 30 | 30 | 8.0 | 8.0 | 7.0 | With various tire patterns |
| | | | | | 30 | 30 | 4.0 | 7.0 | 4.0 | |
| | | | | | 30 | 30 | 7.0 | 7.0 | 6.0 | |
| | Group 2 | Vehicle 1 (FF-Car) | 205/55R16V | GVW | 15 | 30 | 3.0 | 8.0 | 7.0 | With various tire inflation pressures |
| | | | | | 21 | 30 | 7.0 | 7.0 | 7.0 | |
| | | | | | 30 | 30 | 5.0 | 7.0 | 7.0 | |
| | | | | | 30 | 20 | 5.0 | 5.0 | 6.0 | |
| | | | | | 30 | 15 | 4.0 | 4.0 | 5.0 | |
| | Group 3 | Vehicle 2 (FR-Car) | 235/45ZR17 | Curb + 2 persons | 32.7 | 38.4 | 7.0 | 7.0 | 6.6 | With various tire design specifications |
| | | | | | 32.7 | 38.4 | 6.6 | 6.8 | 6.4 | |
| | | | | | 32.7 | 38.4 | 7.0 | 6.8 | 6.4 | |
| | | | | | 32.7 | 38.4 | 7.6 | 7.4 | 7.2 | |
| | | | | | 32.7 | 38.4 | 6.2 | 6.4 | 6.0 | |
| Set2 | Driver A | Vehicle 1 (FF-Car) | 205/55R16V | Curb + 2 persons | 15 | 30 | 3.0 | 8.0 | 4.0 | With various drivers |
| | | | | | 21 | 30 | 4.0 | 5.0 | 3.0 | |
| | | | | | 30 | 30 | 5.0 | 7.0 | 5.0 | |
| | | | | | 30 | 20 | 5.0 | 5.0 | 6.0 | |
| | | | | | 30 | 15 | 5.0 | 4.0 | 6.0 | |
| | Driver B | Vehicle 1 (FF-Car) | 205/55R16V | Curb + 2 persons | 15 | 30 | 6.5 | 7.5 | 7.5 | |
| | | | | | 21 | 30 | 6.75 | 7.25 | 7.5 | |
| | | | | | 30 | 30 | 7 | 6.75 | 7 | |
| | | | | | 30 | 20 | 6.75 | 7.25 | 7.25 | |
| | | | | | 30 | 15 | 6.25 | 7.25 | 7.5 | |
| | Driver C | Vehicle 1 (FF-Car) | 205/55R16V | Curb + 2 persons | 15 | 30 | 6.5 | 6.5 | 6.5 | |
| | | | | | 21 | 30 | 6.67 | 6.67 | 6.67 | |
| | | | | | 30 | 30 | 7 | 7 | 7 | |
| | | | | | 30 | 20 | 7 | 6.83 | 6.83 | |
| | | | | | 30 | 15 | 6.75 | 6.83 | 6.75 | |

Elaborating upon the above Table 1 indicative of the steer characteristic analysis result associated with a plurality of tests, desired data indicative of the subject assessment result higher the value of $R^2$, the higher the subjective assessment and correlation. It can be recognized that the value of US has a high correlation degree of 0.9 and over in most tests. The US coefficient denoted by the above equation 5 can select one of two factors (i.e., a turning curvature and a turning velocity associated with understeer). In this case, the selected factor has a higher correlation with the subjective assessment result as compared to the other factor.

vehicle turning operation using the above equations 8, 9, and 10, the subjective assessment result, and the correlation are shown in the following table 3. It can be recognized that the value of OS has a high correlation degree of 0.9 and over in most tests. The OS coefficient denoted by the above equation

TABLE 2

| Understeer parameters $\Delta k_d$ $\Delta \omega_d$ | Test group | Objective parameter | Coefficients of determination $R^2$ | | | | | | |
|---|---|---|---|---|---|---|---|---|---|
| | | | Lane changing | | Severe lane changing | | | Circuit cornering | Power on/off in a turn |
| | | | 1st | 2nd | 1st | 2nd | 3rd | | |
| | Group 1 | $\Delta k_d$ | 0.34 | 0.03 | 0.47 | 0.19 | 0.15 | 0.61 | 0.92 |
| | | $\Delta \omega_d$ | 0.28 | 0.01 | 0.18 | 0.08 | 0.16 | 0.09 | 0.82 |
| | | US | 0.36 | 0.03 | 0.47 | 0.19 | 0.16 | 0.61 | 0.93 |
| | Group 2 | $\Delta k_d$ | 0.91 | 0.01 | 0.73 | 0.00 | 0.11 | 0.16 | 0.39 |
| | | $\Delta \omega_d$ | 0.77 | 0.00 | 0.73 | 0.00 | 0.17 | 0.39 | 0.32 |
| Understeer coefficient $US \equiv w_{us1}\Delta k_d + w_{us2}\Delta \omega_d$ | | US | 0.92 | 0.01 | 0.74 | 0.00 | 0.17 | 0.39 | 0.39 |
| | Group 3 | $\Delta k_d$ | 0.91 | 0.92 | 0.38 | 0.01 | 0.31 | 0.11 | 0.49 |
| | | $\Delta \omega_d$ | 0.88 | 0.57 | 0.32 | 0.02 | 0.37 | 0.81 | 0.24 |
| | | US | 0.91 | 0.92 | 0.38 | 0.02 | 0.37 | 0.81 | 0.49 |
| | Driver A | $\Delta k_d$ | 0.42 | 0.38 | 0.41 | 0.25 | 0.00 | 0.80 | 0.87 |
| | | $\Delta \omega_d$ | 0.38 | 0.51 | 0.06 | 0.01 | 0.00 | 0.50 | 0.88 |
| | | US | 0.42 | 0.51 | 0.41 | 0.25 | 0.00 | 0.80 | 0.88 |
| | Driver B | $\Delta k_d$ | 0.02 | 0.42 | 0.32 | 0.00 | 0.00 | 0.29 | 0.01 |
| | | $\Delta \omega_d$ | 0.80 | 0.14 | 0.08 | 0.00 | 0.00 | 0.44 | 0.03 |
| Choose better correlated parameter | | US | 0.80 | 0.42 | 0.37 | 0.00 | 0.00 | 0.44 | 0.03 |
| | Driver C | $\Delta k_d$ | 0.90 | 0.18 | 0.91 | 0.23 | 0.11 | 0.41 | 0.01 |
| | | $\Delta \omega_d$ | 0.68 | 0.61 | 0.97 | 0.13 | 0.20 | 0.33 | 0.03 |
| | | US | 0.90 | 0.61 | 0.97 | 0.13 | 0.20 | 0.56 | 0.03 |

The following table 3 shows an oversteer analysis method proposed by the present invention. The oversteer analysis results of the lane-changing test, the severe lane-changing test, the circuit cornering test, and the power on/off test in a 10 can select one of two factors (i.e., a nose angle and a nose-angle time rate associated with oversteer). In this case, the selected factor has a higher correlation with the subjective assessment result as compared to the other factor.

TABLE 3

| Oversteer parameters $\Delta \varphi_d$ $\Delta \dot{\varphi}_d$ | Test Group | Objective parameter | Coefficients of determination $R^2$ | | | | |
|---|---|---|---|---|---|---|---|
| | | | Lane changing | Severe lane changing | | Circuit cornering | Power on/off in a turn |
| | | | | 1st | 2nd | | |
| | Group 1 | $\Delta \varphi_d$ | 0.44 | 0.51 | 0.80 | 0.00 | 0.77 |
| | | $\Delta \dot{\varphi}_d$ | 0.24 | 0.57 | 0.91 | 0.46 | 0.00 |
| | | OS | 0.44 | 0.57 | 0.91 | 0.00 | 0.77 |
| | Group 2 | $\Delta \varphi_d$ | 0.98 | 0.47 | 0.59 | 0.57 | 0.42 |
| | | $\Delta \dot{\varphi}_d$ | 0.91 | 0.55 | 0.62 | 0.00 | 0.44 |
| Oversteer coefficient $OS \equiv w_{os1}\Delta \varphi_d + w_{os2}\Delta \dot{\varphi}_d$ | | OS | 0.98 | 0.55 | 0.62 | 0.57 | 0.48 |
| | Group 3 | $\Delta \varphi_d$ | 0.82 | 0.62 | 0.92 | 0.86 | 0.83 |
| | | $\Delta \dot{\varphi}_d$ | 0.90 | 0.62 | 0.92 | 0.97 | 0.07 |
| | | OS | 0.90 | 0.62 | 0.92 | 0.97 | 0.83 |
| | Driver A | $\Delta \varphi_d$ | 0.25 | 0.70 | 0.86 | 0.29 | 0.78 |
| | | $\Delta \dot{\varphi}_d$ | 0.42 | 0.78 | 0.90 | 0.60 | 0.02 |
| | | OS | 0.42 | 0.78 | 0.90 | 0.60 | 0.79 |
| | Driver B | $\Delta \varphi_d$ | 0.79 | 0.45 | 0.77 | 0.46 | 0.21 |
| Choose better correlated parameter | | $\Delta \dot{\varphi}_d$ | 0.68 | 0.50 | 0.80 | 0.35 | 0.20 |
| | | OS | 0.79 | 0.50 | 0.80 | 0.50 | 0.20 |
| | Driver C | $\Delta \varphi_d$ | 0.70 | 0.15 | 0.01 | 0.85 | 0.00 |
| | | $\Delta \dot{\varphi}_d$ | 0.46 | 0.00 | 0.01 | 0.00 | 0.18 |
| | | OS | 0.70 | 0.15 | 0.01 | 0.85 | 0.18 |

The following table 4 shows a power-off reaction analysis method of the present invention. The power-off reaction analysis result of the power on/off test in a vehicle turing operation using the above equation 11, the subjective assessment result, and the correlation are shown in the following table 4. It can be recognized that the value of PR has a high correlation degree of 0.9 and over in most tests. The power-off reaction coefficient of the above equation 11 includes nose-angle associated data corresponding to a nose angle change amount, for example, a nose-angle slope, a change rate, and a change amount, such that it can increase a correlation degree associated with the subjective assessment.

TABLE 4

Power off reaction parameters $\varphi_{d\_slope}$   $\dfrac{\varphi_{d\_pp}}{\Delta t}$   $\varphi_{d\_pp}$

⇓

Power off reaction coefficient $$PR \equiv w_{pr1}\left|\varphi_{d\_slope}\right| + w_{pr2}\dfrac{\left|\varphi_{d\_pp}\right|}{\Delta t} + w_{pr3}\left|\varphi_{d\_pp}\right|$$

⇓

Synergy effect

| Test group | Coefficients of determination of objective parameters $R^2$ | | | |
|---|---|---|---|---|
|  | $\varphi_{d\_slope}$ | $\varphi_{d\_pp}/\Delta t$ | $\varphi_{d\_pp}$ | PR |
| Group 1 | 0.72 | 0.70 | 0.16 | 0.85 |
| Group 2 | 0.84 | 0.95 | 0.29 | 0.95 |
| Group 3 | 0.76 | 0.84 | 0.68 | 0.94 |
| Driver 1 | 0.74 | 0.62 | 0.37 | 0.86 |
| Driver 2 | 0.92 | 0.74 | 0.54 | 0.92 |
| Driver 3 | 0.80 | 0.67 | 0.88 | 0.95 |

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method for quantitatively analyzing steer characteristics to acquire steering stability of a vehicle and a tire, comprising the steps of:
   mounting a real-vehicle measurement device to the vehicle;
   performing a variety of real-vehicle tests including a lane-changing test, a severe lane-changing test, a circuit cornering test, and a power on/off test in a vehicle turning operation, and acquiring measurement data;
   calculating a turning curvature, a turning velocity, a nose angle, and a nose-angle time rate on the basis of the acquired measurement data;
   comparing the turning curvature, the turning velocity, the nose angle, and the nose-angle time rate with reference data, including a reference turning curvature, a reference turning velocity, reference nose-angle and reference nose-angle time rate respectively;
   calculating a slope, a change rate, and a change amount of the nose angle during the power on/off test; and
   determining a steer characteristic degree on the basis of a result of the comparison and the calculated slope, change rate and change amount of the nose angle.

2. The method according to claim 1, wherein the lane-changing test is a first lane changing test that determines a lane-changing width to be 2.5~4.5 m, has a handle entry signal in the form of a sinusoidal signal, determines a handle entry angle to be −180°~+180°, and determines vehicle speed to be a constant speed in the range of 40~350 kaph.

3. The method according to claim 1, wherein the severe lane-changing test is used to return to an original lane after changing a first lane of the vehicle to another lane, turns off an acceleration pedal simultaneously with performing a handle entry operation while the vehicle travels straight on the assumption that a lane-changing width is 2.5~4.5 m and vehicle speed is in the range of 60~200 kph.

4. The method according to claim 1, wherein the power on/off test in the vehicle turning operation is performed by suddenly pressing an acceleration pedal during a normal turning operation of the vehicle, maintaining the pressed acceleration pedal, and suddenly releasing the acceleration pedal, wherein
   if an initial normal turning velocity is determined to be equal to or higher than lateral acceleration of 0.5 g, the pressed time of the acceleration pedal is determined to be 1.0~5.0 seconds, and a maximum entry magnitude of the acceleration pedal is determined to be $A_0$ (mm) during the 1.0~5.0 seconds, an acceleration pedal entry magnitude is determined in the range of ½~10 ratio associated with a value of $A_0$.

5. The method according to claim 1, wherein the reference data is acquired by a normal circle-turning test indicative of a Quasi steady-state condition test during which a vehicle driving state is stable, a weave steering test, or a progressive steering test after the real-vehicle measurement device has been mounted to the vehicle, and allows a turning curvature, a turning velocity, and a nose angle associated with understeer and oversteer of the vehicle to be fit to a curve using a steering function.

6. The method according to claim 5, wherein the normal circle-turning test uses a test method for changing a turning radius at a predetermined vehicle speed, determines vehicle speed to be 40~350 kph for use in a real-vehicle estimation test, and determines a turning radius to be 10~200 m so that a handle entry range is determined to be −360°~+360°.

7. The method according to claim 5, wherein the weave steering test slowly sweeps a steering angle using a triangular or sinusoidal wave at a predetermined vehicle speed, determines a handle entry angle to be −360~+360°, includes reference data associated with an area having a large steering angle, determines a handle entry speed to be a low value of 1~50 degrees/s or less, determines vehicle speed to be 44~350 kph for use in a real vehicle estimation test, and the weave steering test is capable of performing a variety of tests associated with one or more periods in the case of a handle entry operation, averages data associated with handle entry operations of several periods, and uses the averaged result as second reference data.

8. The method according to claim 5, wherein the progressive steering test separately performs a left-side turning test and a right-side turning test at a predetermined vehicle speed, adds left data and right data, uses the added result as second reference data, determines a handle entry range to be −360~+360° based on reference data associated with an area having a large steering angle, determines a handle entry speed to be a low value of 1~50 degrees/s, and determines vehicle speed to be 40~350 kph for use in a real vehicle estimation test.

9. The method according to claim 1, wherein the measurement data are measured in a driver's seat or a vehicle's center of gravity.

10. The method according to claim 1, wherein the method includes analyzing an understeer which includes the steps of:
mounting the real-vehicle measurement device to the vehicle;
performing a real-vehicle test associated with understeer estimation to acquire measurement data;
calculating a turning curvature and a turning velocity on the basis of the acquired measurement data;
comparing the turning curvature and the turning velocity with a reference turning curvature and a reference turning velocity, respectively; and
determining a degree of understeer on the basis of a result of the comparison.

11. The method according to claim 10, wherein the understeer analysis method includes the steps of:
indicating the reference turning curvature $\kappa_{d(N)}$ and the turning curvature $\kappa_d$ measured during the real-vehicle test on a Y-axis, and using a predetermined turning curvature graph in which a time or steering angle is determined to be an X-axis;
calculating a difference in turning curvature using the turning curvature graph and the following equation $\Delta\kappa_d = |\kappa_{d(N)} - \kappa_d|$;
indicating the reference turning velocity $\omega_{d(N)}$ and the turning velocity measured during the real-vehicle test on a Y-axis, and using a predetermined turning velocity graph in which a time or steering angle is determined to be an X-axis; and
calculating a difference in turning velocity using the turning velocity graph and the following equation $\Delta\omega_d = |\omega_{d(N)} - \omega_d|$, wherein
according to the understeer analysis method, an understeer coefficient (US) is determined by the following equation $US \equiv w_{us1}\Delta\kappa_d + w_{us2}\Delta\omega_d > 0$ using the turning curvature difference $\Delta\omega_d$ and the turning velocity difference $\Delta\omega_d$, wherein
the turning curvature difference $\Delta\kappa_d$ and the turning velocity difference $\Delta\omega_d$ are quantitatively analyzed by selecting a maximum value or a mean value from the turning curvature graph and the turning velocity graph obtained by the real-vehicle test, and
the values of $w_{us1} \geq 0$ and $w_{us2} \geq 0$ are indicative of understeer weighting factors, and are determined by an estimator's desire.

12. The method according to claim 1, wherein the method includes analyzing an oversteer which includes the steps of:
mounting the real-vehicle measurement device to the vehicle;
performing a real-vehicle test associated with oversteer estimation to acquire measurement data;
calculating a nose angle and a nose-angle time rate on the basis of the acquired measurement data;
comparing the nose angle and the nose-angle time rate with a reference nose angle and a reference nose-angle time rate, respectively; and
determining a degree of oversteer on the basis of a result of the comparison.

13. The method according to claim 12, wherein the oversteer analysis method includes the steps of:
indicating the reference nose angle $\phi_{d(N)}$ and the nose angle $\phi_d$ measured during the real-vehicle test on a Y-axis, and using a predetermined nose angle graph in which a time or steering angle is determined to be an X-axis;
calculating a difference in nose angle using the nose angle graph and the following equation $\Delta\phi_d = |\phi_d - \phi_{d(N)}|$;
indicating the nose-angle time rate $\dot\phi_d$ measured during the real-vehicle test on a Y-axis, and using a predetermined nose-angle time rate graph in which a time or steering angle is determined to be an X-axis; and
calculating a nose-angle time rate using the nose-angle time rate graph and the following equation $\Delta\dot\phi_d = |\dot\phi_d|$, wherein
according to the oversteer analysis method, an oversteer coefficient (OS) is determined by the following equation $OS \equiv w_{us1}\Delta\phi_d + w_{us2}\Delta\dot\phi_d > 0$ using the nose-angle difference $\Delta\phi_d$ and the nose-angle time rate $\Delta\dot\phi_d$, wherein
the nose-angle difference $\Delta\phi_d$ and the nose-angle time rate $\Delta\dot\phi_d$ are quantitatively analyzed by selecting a maximum value or a mean value from the nose angle graph and the nose-angle time rate graph obtained by the real-vehicle test, and
the values of $W_{us1} \geq 0$ and $w_{us2} \geq 0$ are indicative of oversteer weighting factors, and are determined by an estimator's desire.

14. The method according to claim 1, wherein the method includes analyzing a power-off reaction which includes the steps of:
mounting the real-vehicle measurement device to the vehicle;
performing a real-vehicle test associated with power-off reaction estimation to acquire measurement data;
calculating a nose angle on the basis of the acquired measurement data; and
indicating the calculated nose angle on a Y-axis, and using a predetermined graph in which time is determined to be an X-axis, wherein
the power-off reaction is quantitatively analyzed by a nose-angle slope $|\phi_{d\_slope}|$, a nose-angle change rate $|\phi_{d\_pp}|/\Delta t$, and a nose-angle change amount $|\phi_{d\_pp}|$ contained in the following equation $$PR \equiv w_{pr1}|\varphi_{d\_slope}| + w_{pr2}\frac{|\varphi_{d\_pp}|}{\Delta t} + w_{pr3}|\varphi_{d\_pp}| > 0,$$

where $w_{pr1} \geq 0$, $w_{pr2} \geq 0$ are indicative of power-off reaction weighting factors and are determined by an estimator's desire.

* * * * *